United States Patent
Lee et al.

(10) Patent No.: US 12,282,317 B2
(45) Date of Patent: Apr. 22, 2025

(54) WAFER DEFECT TEST APPARATUS, WAFER DEFECT TEST SYSTEM, WAFER TEST METHOD AND FABRICATION METHOD OF A WAFER

(71) Applicant: SAMSUNG ELECTRONICS CO., LTD., Suwon-si (KR)

(72) Inventors: Sung Hee Lee, Osan-si (KR); Jae Yoon Kim, Seoul (KR); Jung Hwan Moon, Seoul (KR); Jung Hoon Bak, Suwon-si (KR); Kyu-Baik Chang, Seoul (KR); Jae Hoon Jeong, Hwaseong-si (KR); Min Kyoung Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 590 days.

(21) Appl. No.: 17/680,958

(22) Filed: Feb. 25, 2022

(65) Prior Publication Data

US 2023/0055058 A1 Feb. 23, 2023

(30) Foreign Application Priority Data

Aug. 23, 2021 (KR) .................. 10-2021-0110621

(51) Int. Cl.
G05B 19/418 (2006.01)
G06N 5/02 (2023.01)

(52) U.S. Cl.
CPC ......... *G05B 19/41875* (2013.01); *G06N 5/02* (2013.01); *G05B 2219/32368* (2013.01); *G05B 2219/45031* (2013.01)

(58) Field of Classification Search
CPC .... G05B 19/41875; G05B 2219/32368; G05B 2219/45031; G06N 5/02; G06N 20/00
See application file for complete search history.

(56) References Cited

U.S. PATENT DOCUMENTS 7,194,133 B2  3/2007  Jinnai
9,401,015 B2  7/2016  Minekawa et al.
(Continued)

FOREIGN PATENT DOCUMENTS

JP   2012015410 A   1/2012
JP   2019091354 A   6/2019
KR      1744194 B1   6/2017

*Primary Examiner* — Kamini S Shah
*Assistant Examiner* — Mohammed Shafayet
(74) *Attorney, Agent, or Firm* — Fish & Richardson P.C.

(57) ABSTRACT

A wafer defect test apparatus in which a defect prediction performance is improved and a simulation time is shortened is provided. The wafer defect test apparatus comprises a wafer variable generator which receives a first structural measurement data and a first process condition data of a first wafer, and a second structural measurement data and a second process condition data of a second wafer, generates a first process variable and a second process variable based on the first structural measurement data and the first process condition data, and generates a third process variable and a fourth process variable based on the second structural measurement data and the second process condition data, an abnormal wafer index generating circuit which generates a first wafer vector of the first process variable and second process variable, generates a second wafer vector of the third process variable and fourth process variable, calculates a first Euclidean distance between the first wafer vector and the second wafer vector, calculates a first Cosine distance between the first wafer vector and the second wafer vector, and generates a first abnormal wafer index of the first wafer based on a product of the first Euclidean distance and the first Cosine distance, and a prediction model generating circuit which receives a first characteristic variable which is a test result of the first wafer, and generates a wafer defect prediction model through a regression based on the first (Continued)

process variable, the second process variable, the first characteristic variable, and the first abnormal wafer index.

19 Claims, 28 Drawing Sheets

(56) References Cited

U.S. PATENT DOCUMENTS

| | | | |
|---|---|---|---|
| 10,579,901 B2 | 3/2020 | Ye et al. | |
| 2019/0171905 A1* | 6/2019 | Ye | G06V 40/161 |
| 2019/0277913 A1 | 9/2019 | Honda et al. | |
| 2020/0327654 A1* | 10/2020 | Zhang | G06T 7/0004 |
| 2023/0080151 A1* | 3/2023 | Shkalim | G06T 7/0008 |
| | | | 382/149 |
| 2023/0118839 A1* | 4/2023 | Zhang | G06T 7/001 |
| | | | 382/149 |

* cited by examiner

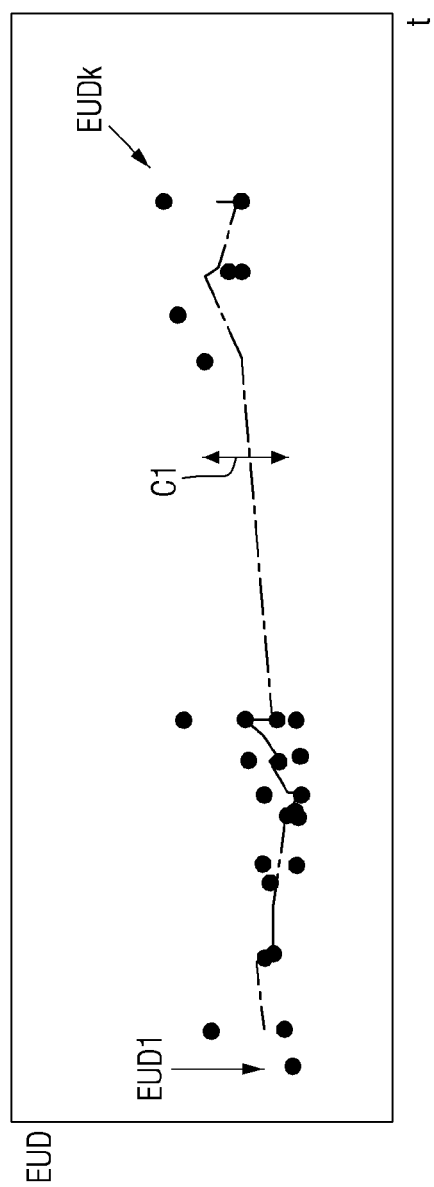

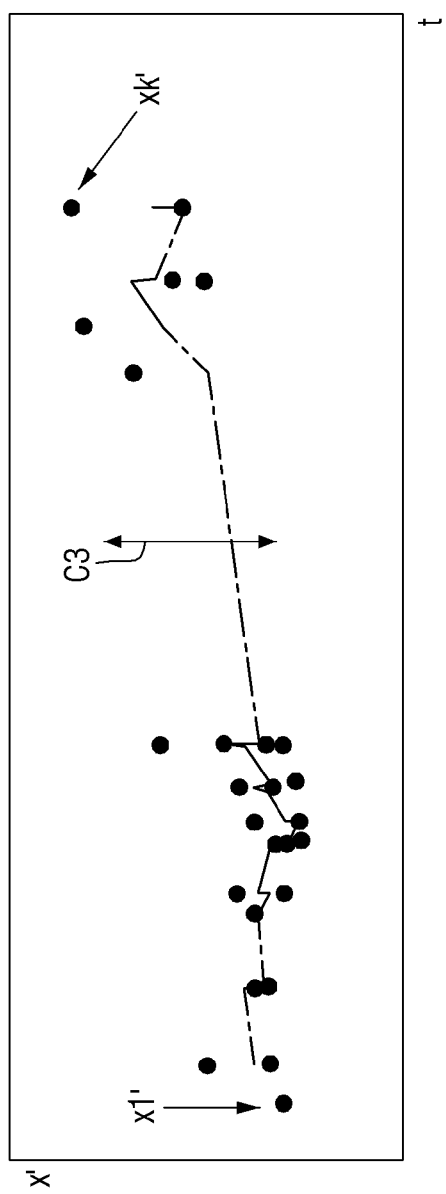

FIG. 11a

|  | Wafer # (k) | Process variable # (n) | Calculation Amount | Simulation Time |
|---|---|---|---|---|
| SHAP Model | 300 | 10 | $2^n * K * 13$ | 5.6 hour |
| Vector Similarity Model | 300 | 10 | $n*(n-1)*K$ | 5 min. |

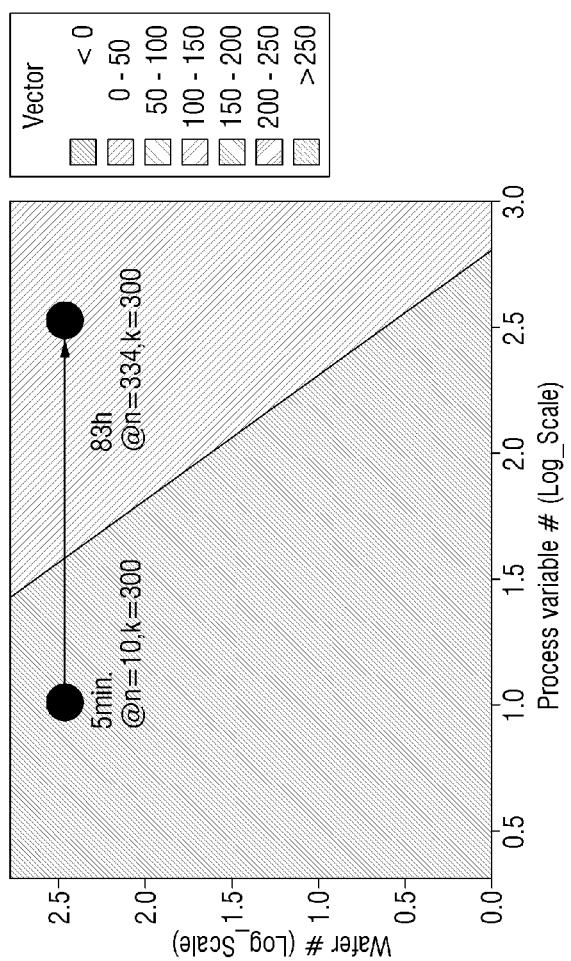

WAFER DEFECT TEST APPARATUS, WAFER DEFECT TEST SYSTEM, WAFER TEST METHOD AND FABRICATION METHOD OF A WAFER

This application is based on and claims the benefit of priority under 35 U.S.C. § 119 to Korean Patent Application No. 10-2021-0110621, filed on Aug. 23, 2021 in the Korean Intellectual Property Office, the disclosure of which is incorporated herein in its entirety by reference.

BACKGROUND

1. Field

The present disclosure relates to a wafer defect test apparatus, a wafer defect test system, a wafer test method, and a method for fabricating a wafer.

2. Description of the Related Art

A wafer fabricating process in a FAB (i.e., a semiconductor manufacturing plant) may cause some defects. Final semiconductor products may fail depending on the defect types. In order to solve such a problem, a method of pre-detecting a wafer defect and analyzing a cause in the FAB fabricating process is required. The quality and reliability of semiconductors may be improved by performing a wafer defect pre-detection and cause analysis before the semiconductor product is finally produced. A conventional automatic defect detection method predicts presence or absence of a wafer defect based on input data of the semiconductor, and is often used in the semiconductor FAB fabricating process.

A conventional wafer defect detection and prediction method using deep learning has drawbacks in that it is difficult to secure a prediction model for large-scale data and the data explanation function is insufficient. Further, an explainable AI model, which has a data explanation function, has a drawback in that a large amount of simulation time is consumed, and a solution thereof is required.

SUMMARY

According to some aspects of the present disclosure, a wafer defect test apparatus is provided in which a defect prediction performance is improved and a simulation time is shortened.

According to some aspects of the present disclosure, a wafer defect test system is provided in which a defect prediction performance is improved and a simulation time is shortened.

According to some aspects of the present disclosure, a wafer fabricating method is provided in which a defect prediction performance is improved and a simulation time is shortened.

According to some aspects of the present disclosure, a wafer test method is provided in which a defect prediction performance is improved and a simulation time is shortened.

However, aspects of the present disclosure are not restricted to the one set forth herein. These and other aspects of the present disclosure will become more apparent to one of ordinary skill in the art to which the present disclosure pertains by referencing the detailed explanation of the present disclosure given below.

According to an aspect of the present disclosure, a wafer defect test apparatus includes a wafer variable generator, an abnormal wafer index generating circuit, and a prediction model generating circuit. The wafer variable generator receives a first structural measurement data and a first process condition data of a first wafer, and a second structural measurement data and a second process condition data of a second wafer, generates a first process variable and a second process variable based on the first structural measurement data and the first process condition data, and generates a third process variable and a fourth process variable based on the second structural measurement data and the second process condition data. The abnormal wafer index generating circuit generates a first wafer vector of the first process variable and second process variable, generates a second wafer vector of the third process variable and fourth process variable, calculates a first Euclidean distance between the first wafer vector and the second wafer vector, calculates a first Cosine distance between the first wafer vector and the second wafer vector, and generates a first abnormal wafer index of the first wafer based on a product of the first Euclidean distance and the first Cosine distance. The prediction model generating circuit which receives a first characteristic variable which is a test result of the first wafer, and generates a wafer defect prediction model through a regression based on the first process variable, the second process variable, the first characteristic variable, and the first abnormal wafer index.

According to an aspect of the present disclosure, a wafer defect test system includes a monitoring apparatus and a computing apparatus. The monitoring apparatus monitors a first wafer, a second wafer, and a third wafer being fabricated. The computing apparatus is connected to the monitoring apparatus. The monitoring apparatus monitors the first wafer to generate a first process variable and a second process variable. The monitoring apparatus monitors the second wafer to generate a third process variable and a fourth process variable. The monitoring apparatus monitors the third wafer to generate a fifth process variable and a sixth process variable. The computing apparatus generates a first wafer vector of the first process variable and the second process variable. The computing apparatus generates a second wafer vector of the third process variable and the fourth process variable. The computing apparatus generates a third wafer vector of the fifth process variable and the sixth process variable. The computing apparatus calculates a first Euclidean distance between the first wafer vector and the second wafer vector. The computing apparatus calculates a first Cosine distance between the first wafer vector and the second wafer vector. The computing apparatus calculates a second Euclidean distance between the first wafer vector and the third wafer vector. The computing apparatus calculates a second Cosine distance between the first wafer vector and the third wafer vector. The computing apparatus calculates a third Euclidean distance between the second wafer vector and the third wafer vector. The computing apparatus calculates a third Cosine distance between the second wafer vector and the third wafer vector. The computing apparatus generates a first abnormal wafer index of the first wafer, based on a product of the first Euclidean distance and the first Cosine distance and a product of the second Euclidean distance and the second Cosine distance. The computing apparatus generates a second abnormal wafer index of the second wafer, based on the product of the first Euclidean distance and the first Cosine distance and a product of the third Euclidean distance and the third Cosine distance. The computing apparatus generates a third abnormal wafer index of the third wafer, based on a product of the second Euclidean distance and the second Cosine distance and the product of the third Euclidean distance and the third Cosine distance. The computing apparatus predicts defective wafers among the first wafer to the third wafer, using the first wafer index to the third wafer index.

According to an aspect of the present disclosure, a method for fabricating a wafer includes fabricating a first wafer, a second wafer and a third wafer different from each other, generating a wafer defect prediction model, using the fabricated first wafer and second wafer, and testing for a defect of the third wafer, using the wafer defect prediction model. Generating the wafer defect prediction model includes monitoring the first wafer to generate a first wafer vector of a first process variable and a second process variable, monitoring the second wafer to generate a second wafer vector of a third process variable and a fourth process variable, calculating a first Euclidean distance between the first wafer vector and the second wafer vector, calculating a first Cosine distance between the first wafer vector and the second wafer vector, generating a first abnormal wafer index of the first wafer based on a product of the first Euclidean distance and the first Cosine distance, generating a first characteristic variable by testing the fabricated first wafer, and generating a wafer defect prediction model through regression based on the first process variable, the second process variable, the first characteristic variable, and the first abnormal wafer index.

According to an aspect of the present disclosure, a wafer test method includes monitoring a plurality of wafers different from each other to generate a plurality of wafer vectors on a plurality of process variables, calculating a plurality of Euclidean distances between the plurality of wafer vectors, calculating a plurality of Cosine distances between the plurality of wafer vectors, generating a plurality of abnormal wafer indexes of the plurality of wafers based on a product of one of the plurality of Euclidean distances and one of the plurality of Cosine distances, and predicting a defective wafer among the plurality of wafers, using the plurality of abnormal wafer indexes.

BRIEF DESCRIPTION OF THE DRAWINGS

These and/or other aspects will become apparent and more readily appreciated from the following description of the embodiments, taken in conjunction with the accompanying drawings in which:

FIG. 10a, FIG. 10b and FIG. 10c are diagrams for explaining the Euclidean distance, the Cosine distance and the abnormal wafer index.

FIG. 11a, FIG. 11b and FIG. 11c are diagrams for explaining the wafer defect prediction simulation time.

DETAILED EXPLANATION OF THE EMBODIMENTS

Hereinafter, embodiments of the present disclosure will be described referring to the accompanying drawings.

Figure 1:
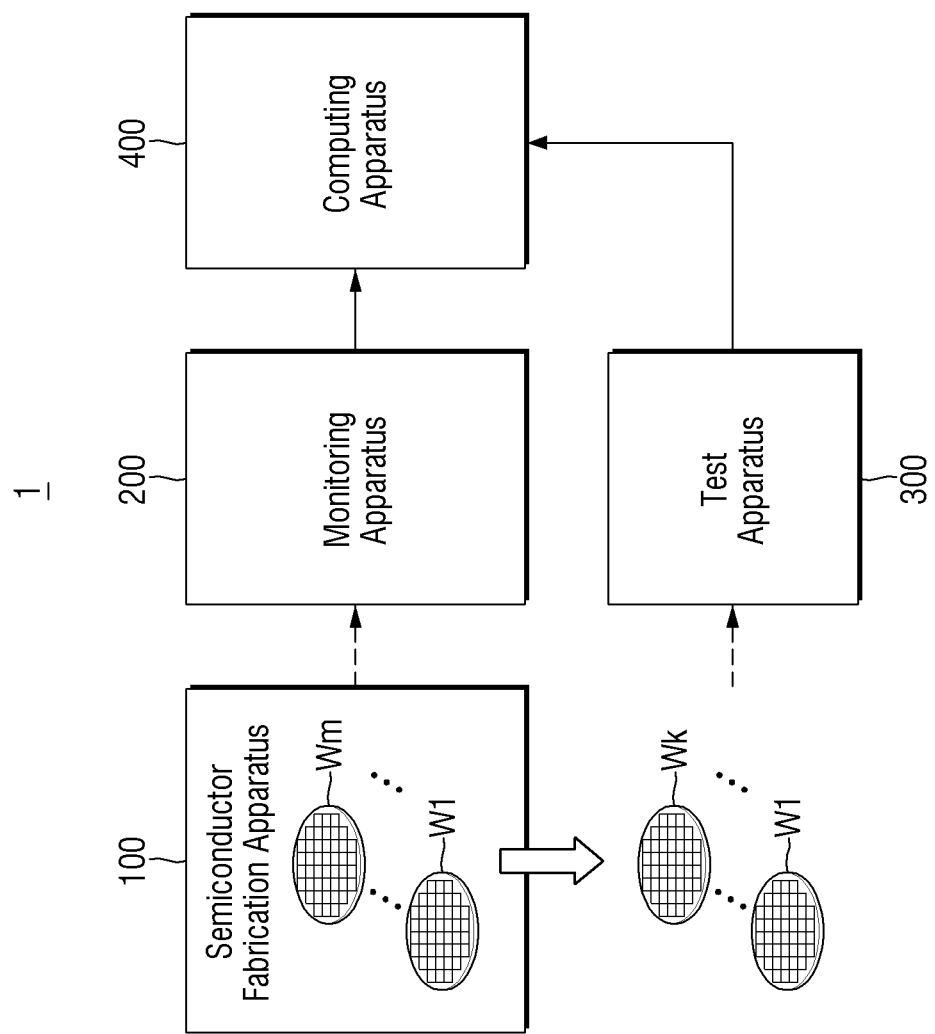
FIG. 1 is a block diagram illustrating a wafer defect test system according to some embodiments.
Figure 2:
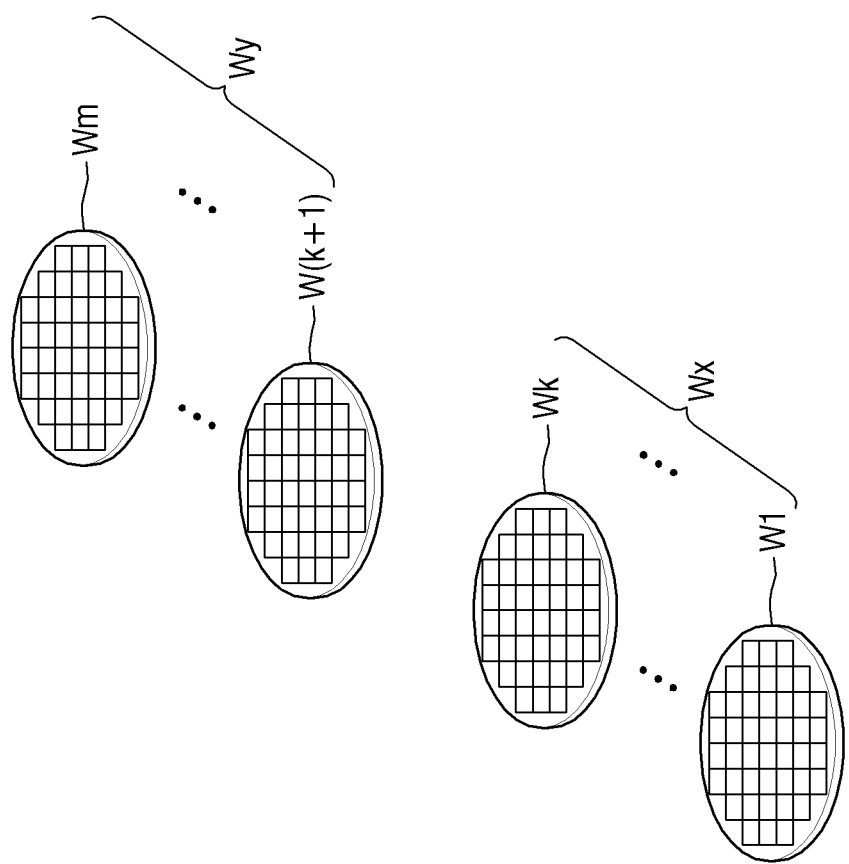
FIG. 2 is a diagram illustrating wafer groups according to some embodiments.

FIG. 1 is a block diagram illustrating a wafer defect test system according to some embodiments. FIG. 2 is a diagram illustrating wafer groups according to some embodiments.

Before proceeding, it should be clear that Figures herein, including FIG. 1, show and reference circuitry with labels such as "monitoring apparatus", "computing apparatus", "test apparatus", "wafer variable average extraction module", "wafer variable standardization module", "abnormal wafer index generating module", "prediction model generation module", "abnormal wafer detector", or similar terms analogous to "unit", "circuit" or "block". As is traditional in the field of the inventive concept(s) described herein, examples may be described and illustrated in terms of such labelled elements which carry out a described function or functions. These labelled elements, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting such labelled elements may be implemented by dedicated hardware, or by a processor (e.g., one or more programmed microprocessors and associated circuitry), or by a combination of dedicated hardware to perform some functions of the labelled element and a processor to perform other functions of the labelled element. Each labelled element of the examples may be physically separated into two or more interacting and discrete circuits without departing from the scope of the present disclosure. Likewise, the labelled elements of the examples such as in the wafer defect test system 1 of FIG. 1 may be physically combined into more complex circuits without departing from the scope of the present disclosure. In some embodiments, several circuits or modules may comprise the same or at least overlapping circuit elements such as a processor, and be distinguished by processing of different software instructions or parallel processing by different cores of the same processor.

Referring to FIG. 1 and FIG. 2, the wafer defect test system 1 may include a semiconductor fabrication apparatus 100, a monitoring apparatus 200, a test apparatus 300, and a computing apparatus 400. However, some embodiments of the present disclosure are not limited thereto, and the wafer defect test system 1 may include constituent elements different from the semiconductor fabrication apparatus 100, the monitoring apparatus 200, the testing apparatus 300, and the computing apparatus 400.

The wafer defect test system 1 may fabricate a plurality of wafers W1 to Wm and test the fabricated plurality of wafers W1 to Wm. Here, the plurality of wafers W1 to Wm may be wafers including semiconductor chips that have been fabricated, or may be wafers that include semiconductor chips that are being fabricated.

In some embodiments, the semiconductor fabrication apparatus 100 may fabricate the plurality of wafers W1 to Wm. Here, the number of the plurality of wafers W1 to Wm may be m. The semiconductor fabrication apparatus 100 may simultaneously fabricate the plurality of wafers W1 to Wm, or may sequentially fabricate the wafers W1 to Wm. For example, the semiconductor fabrication apparatus 100 may fabricate a second wafer group Wy after fabricating a first wafer group Wx. Here, the first wafer group Wx may include first wafer W1 to $k^{th}$ wafer Wk, and the second wafer group Wy may include a $(k+1)^{th}$ wafer W(k+1) to a $m^{th}$ wafer Wm.

The semiconductor fabrication apparatus 100 may output the first wafer group Wx. Here, the semiconductor fabrication apparatus 100 may correspond to FAB. That is, the semiconductor fabrication apparatus 100 may fabricate and output the first wafer group Wx. Here, the first wafer group Wx may correspond to a status in which the fabricating process of the semiconductor fabrication apparatus 100 is completed. The semiconductor fabrication apparatus 100 may fabricate the second wafer group Wy even after fab-out of the first wafer group Wx. That is, the first wafer group Wx and the second wafer group Wy may be sequentially subjected to the fabrication process.

In some embodiments, the monitoring apparatus 200 may perform monitoring on a plurality of wafers W1 to Wm fabricated by the semiconductor fabrication apparatus 100. That is, the monitoring apparatus 200 may monitor the process conditions and fabricating results of the plurality of wafers W1 to Wm. For example, the monitoring apparatus 200 may measure the process conditions of the first wafer W1 and the structure of the first wafer W1 generated by the process conditions. The monitoring apparatus 200 may receive the process conditions from the semiconductor fabrication apparatus 100 and measure the structures of the plurality of wafers W1 to Wm through FDC (fault detection and classification), OCD (optical critical dimension), TEM (transmission electron microscopy), SEM (scanning electron microscopy) and the like. As a result, the monitoring apparatus 200 may monitor the plurality of wafers W1 to Wm in real time. The monitoring apparatus 200 may receive a plurality of process conditions and measure a plurality of structures. Further, the monitoring apparatus 200 may monitor only a specific chip. That is, the monitoring apparatus 200 may monitor specific shots of the plurality of wafers W1 to Wm. However, some embodiments of the present disclosure are not limited thereto.

In some embodiments, the test apparatus 300 may perform one or more test on the wafers W1 to Wk of the first wafer group Wx that is output from the semiconductor fabrication apparatus 100. Here, the test(s) of the test apparatus 300 may include ET (electric tag) and EDS (electric die sorting). That is, the test apparatus 300 may determine whether the functions of the plurality of wafers W1 to Wk are defective. The test apparatus 300 may provide the test result of the first wafer group Wx to the computing apparatus 400.

In some embodiments, the computing apparatus 400 may be connected to the monitoring apparatus 200 and the test apparatus 300. The computing apparatus 400 may receive the process condition data and the structural measurement data from the monitoring apparatus 200, and may receive the test result from the test apparatus 300. That is, the computing apparatus 400 may receive the process condition data and the structural measurement data of the first wafer W1 to the $m^{th}$ wafer Wm, and may receive the test results of the first wafer W1 to the $k^{th}$ wafer Wk. The computing apparatus 400 may generate a wafer defect prediction model based on the received process condition data, structural measurement data and test results, and may predict whether the wafers (for example, $(k+1)^{th}$ to $m^{th}$ wafer W(k+1) to Wm) are defective, using the generated wafer defect prediction model. The computing apparatus 400 may include a processor including a CPU, an ASIC, and the like, and a memory such as a DRAM and a flash memory. Hereinafter, the structure and operation of the wafer defect test system 1 will be described in more detail referring to the drawings.

Figure 3:
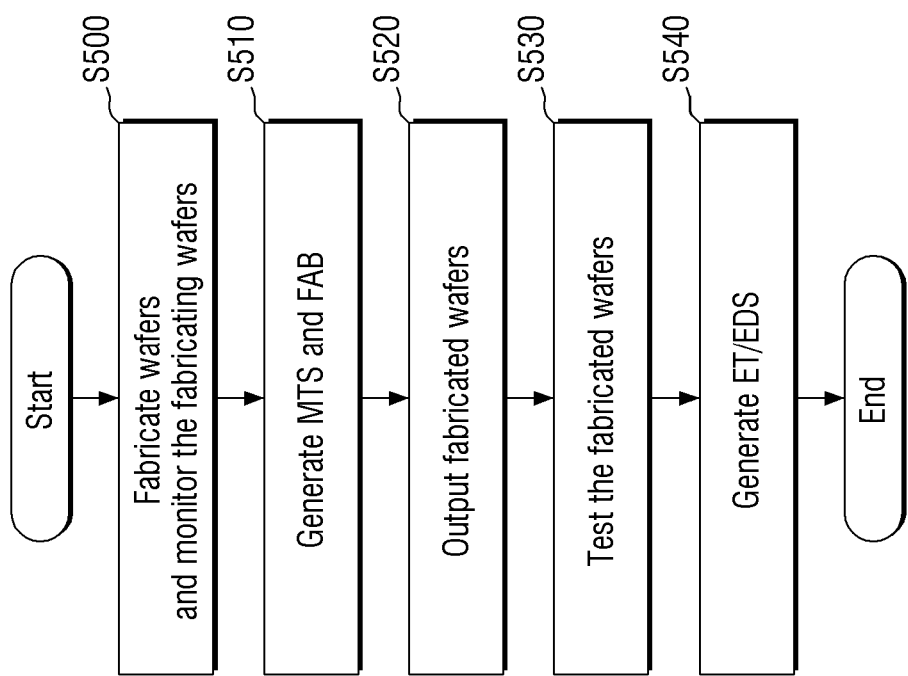
FIG. 3 is a flowchart illustrating operation of the wafer defect test system according to some embodiments.
Figure 4:
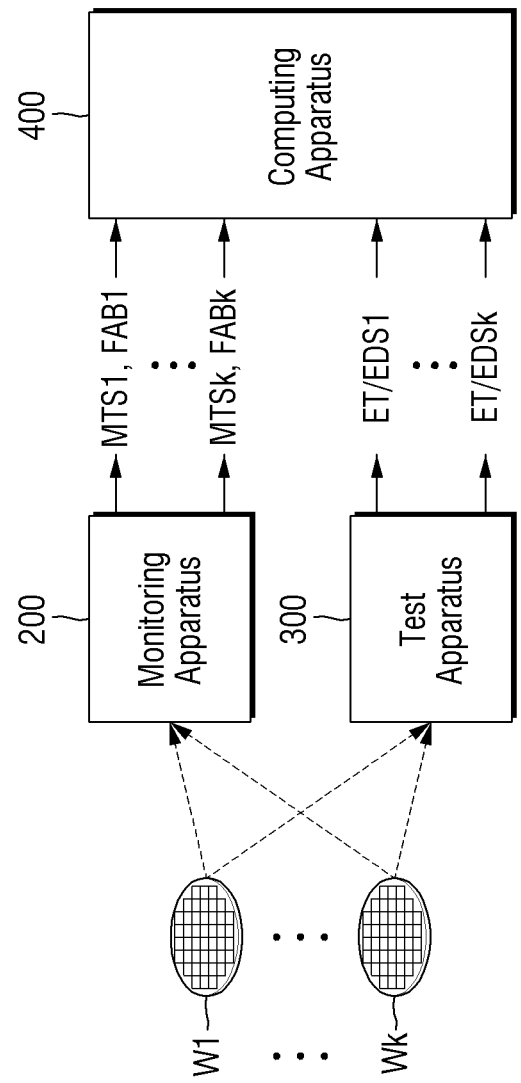
FIG. 4 is a block diagram illustrating the monitoring apparatus and the test apparatus according to some embodiments.

FIG. 3 is a flowchart illustrating the operation of the wafer defect test system according to some embodiments. FIG. 4 is a block diagram illustrating the monitoring apparatus and the test apparatus according to some embodiments.

Referring to FIG. 1, FIG. 2, FIG. 3 and FIG. 4, the semiconductor fabrication apparatus 100 may fabricate wafers W1 to Wm, and the monitoring apparatus 200 may monitor the wafers W1 to Wm being fabricated (S500). The monitoring apparatus 200 may monitor only some shots of the wafers W1 to Wm. That is, the monitoring apparatus 200 may monitor only the dies in a partial region of the wafers W1 to Wm, instead of monitoring all the dies of the wafers W1 to Wm. The monitoring apparatus 200 may monitor the wafer which starts to be fabricated, the wafer being fabricated, and the wafer completely fabricated. That is, the monitoring apparatus 200 may monitor the wafers fabricated at different times and output the results thereof.

Further, the monitoring apparatus 200 may monitor the process conditions used for fabricating the wafers W1 to Wm. For example, the monitoring apparatus 200 may receive the process conditions of the wafers W1 to Wm from the semiconductor fabrication apparatus 100. Although the process conditions of the wafers W1 to Wm may differ for each of the wafers W1 to Wm, the embodiments of the present disclosure are not limited thereto.

The monitoring apparatus 200 may generate structural measurement data MTS and process condition data FAB (S510). Here, the structural measurement data MTS and the process condition data FAB may be generated based on monitoring the fabricated wafers in the process S500. The monitoring apparatus 200 may generate and output the first structural measurement data MTS1 to the $k^{th}$ structural measurement data MTSk and the first process condition data FAB1 to the $k^{th}$ process condition data FABk. Here, the first structural measurement data MTS1 and the first process condition data FAB1 may be the data of the first wafer W1. That is, the monitoring apparatus 200 may generate the first structural measurement data MTS1 and the first process condition data FAB1, as a result of monitoring the first wafer W1. The first structural measurement data MTS1 may include a plurality of structural measurement data, and the first process condition data FAB1 may include a plurality of process condition data. Further, the $k^{th}$ structural measurement data MTSk and the $k^{th}$ process condition data FABk may be data relating to the $k^{th}$ wafer Wk. In this way, the monitoring apparatus 200 may generate a plurality of first structural measurement data MTS1 to $k^{th}$ structural measurement data MTS1 MTSk and first process condition data FAB1 to $k^{th}$ process condition data FABk and provide them to the computing apparatus 400.

The semiconductor fabrication apparatus 100 may output the fabricated wafers W1 to Wk (S520). As a result, the completely fabricated wafers W1 to Wk may be fabricated and output from the semiconductor fabrication apparatus 100, and the remaining wafers W(k+1) to Wm may be fabricated inside the semiconductor fabrication apparatus 100.

The test apparatus 300 may test the fabricated wafers W1 to Wk (S530. As described above, the test apparatus 300 may execute a test on the fabricated wafers W1 to Wk to generate semiconductor element characteristic data ET/EDS (S540). That is, the test apparatus 300 may perform the test on the first wafer W1 to generate a first semiconductor element characteristic data ET/EDS1, and perform the test on the $k^{th}$ wafer Wk to generate a $k^{th}$ semiconductor element characteristic data ET/EDSk. Each semiconductor element characteristic data ET/EDS1 to ET/EDSk may indicate whether each wafer W1 to Wk is defective. However, the embodiments of the present disclosure are not limited thereto, and each semiconductor element characteristic data ET/EDS1 to ET/EDSk may include a plurality of semiconductor element characteristic data for each of the wafers W1 to Wk.

The computing apparatus 400 may receive the first structural measurement data MTS1 to $k^{th}$ structural measurement data MTSk and the first process condition data FAB1 to the $k^{th}$ process condition data FABk from the monitoring apparatus 200, and may receive the first semiconductor characteristic data ET/EDS1 to the $k^{th}$ semiconductor element characteristic data ET/EDSk. The computing apparatus 400 may process the first structural measurement data MATS1 to the $k^{th}$ structural measurement data MTSk, the first process condition data FAB1 to the $k^{th}$ process condition data FABk, and the first semiconductor element characteristic data ET/EDS1 to the $k^{th}$ semiconductor element characteristic data ET/EDSk. This will be described in more detail referring to the drawings.

Figure 5:
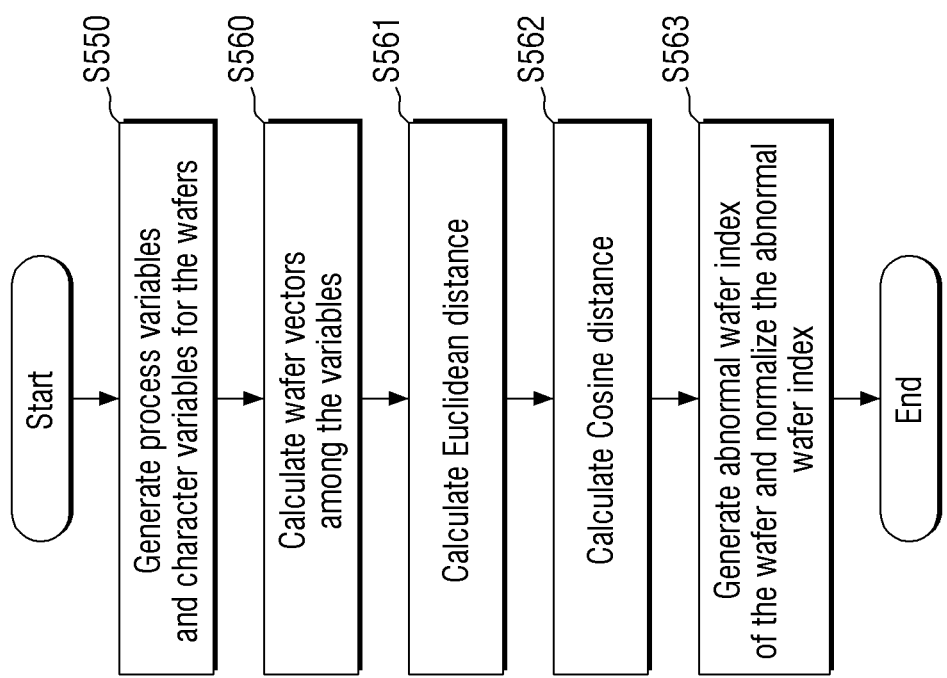
FIG. 5 is a flowchart illustrating a method of generating an abnormal wafer index according to some embodiments.
Figure 6:
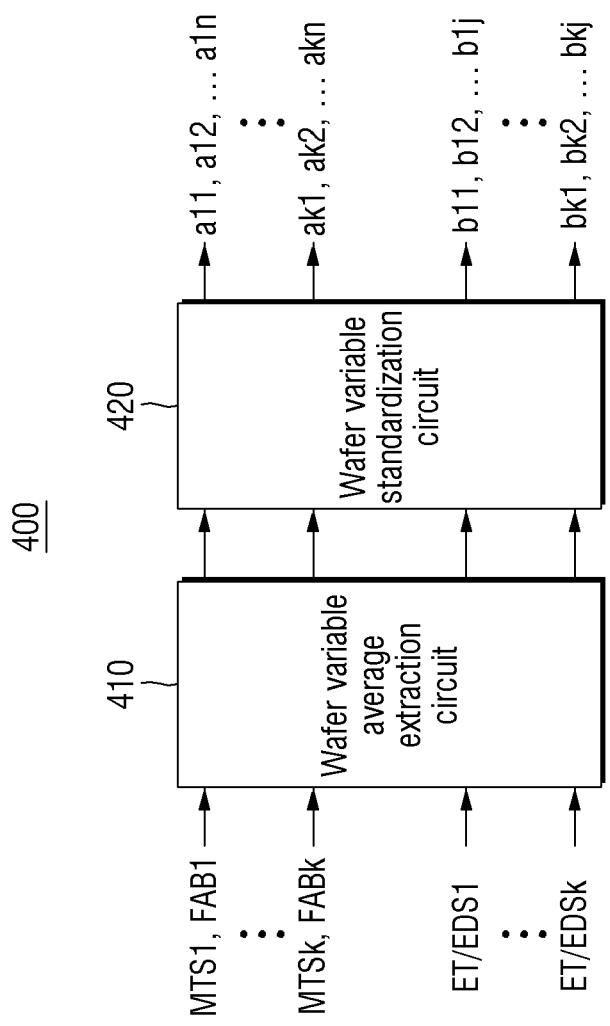
FIG. 6 is a block diagram illustrating the computing apparatus for explaining generation of process variables and characteristic variables according to some embodiments.

FIG. 5 is a flowchart illustrating a method of generating an abnormal wafer index according to some embodiments. FIG. 6 is a block diagram illustrating the computing apparatus for explaining generation of process variables and characteristic variables according to some embodiments.

Referring to FIG. 5 and FIG. 6, the computing apparatus 400 may include a wafer variable average extraction circuit 410 and a wafer variable standardization circuit 420, which together may be referred to as a wafer variable generator. However, the embodiments of the present disclosure are not limited thereto, and the computing apparatus 400 may include other constituent elements other than the wafer variable average extraction circuit 410 and the wafer variable standardization circuit 420.

The computing apparatus 400 may generate process variables and characteristic variables for wafers W1 to Wk (S550).

The wafer variable average extraction circuit 410 may extract and output the averages for the first structural measurement data MTS1 to the $k^{th}$ structural measurement data MTSk and the first process condition data FAB1 to the $k^{th}$ process condition data FABk. The wafer variable standardization circuit 420 may perform standardization on the wafer variable average which is output from the wafer variable average extraction circuit 410. As a result, the wafer variable standardization circuit 420 may output the process variables a11 to akn.

The wafer variable average extraction circuit 410 and the wafer variable standardization circuit 420 may generate the first process variable a11 to the $n^{th}$ process variable a1n based on the first structural measurement data MTS1 and the first process condition data FAB1. Further, the wafer variable average extraction circuit 410 and the wafer variable standardization circuit 420 may generate the first process variable ak1 to the $n^{th}$ process variable kn, based on the $k^{th}$ structural measurement data MTSk and the $k^{th}$ process condition data FABk. That is, the first process variable a11 to the $n^{th}$ process variable akn may correspond to each of the wafers W1 to Wk, respectively. Therefore, the wafer variable average extraction circuit 410 and the wafer variable standardization circuit 420 may generate a plurality of first process variables a11 to $n^{th}$ process variable akn.

For example, as a wafer variable generator, the wafer variable average extraction circuit 410 and the wafer variable standardization circuit 420 may perform average extraction and standardization on the second structural measurement data and the second process condition data to generate a third process variable and a fourth process variable.

Further, the wafer variable average extraction circuit 410 and the wafer variable standardization circuit 420 may generate the first characteristic variable b11 to $j^{th}$ characteristic variable b1j based on the first semiconductor element characteristic data ET/EDS1. Further, the wafer variable average extraction circuit 410 and the wafer variable standardization circuit 420 may generate the first characteristic variable bk1 to the $j^{th}$ characteristic variables bkj based on the $k^{th}$ semiconductor element characteristic data ET/EDSk. Here, the first characteristic variable b11 to the $n^{th}$ characteristic variable bkj may correspond to each of the wafers W1 to Wk, respectively. Here, the generation of the first characteristic variable b11 to the $j^{th}$ characteristic variable b1j using the wafer variable average extraction circuit 410 and the wafer variable standardization circuit 420 may follow the generation of the first process variable a11 to the $n^{th}$ process variable akn.

Figure 7:
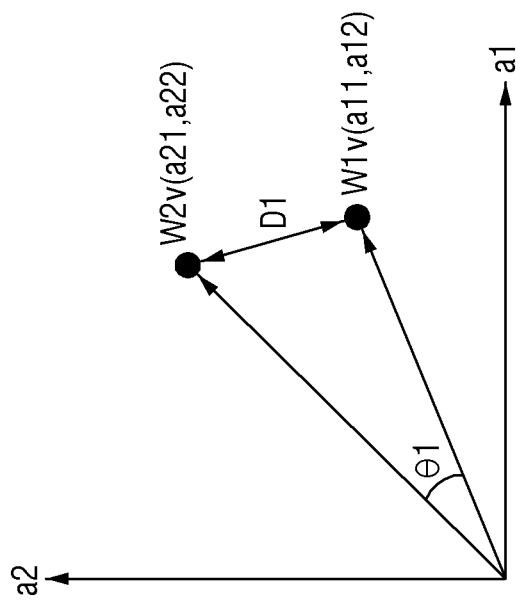
FIG. 7 is a diagram for explaining a Euclidean distance and a Cosine distance.
Figure 8:
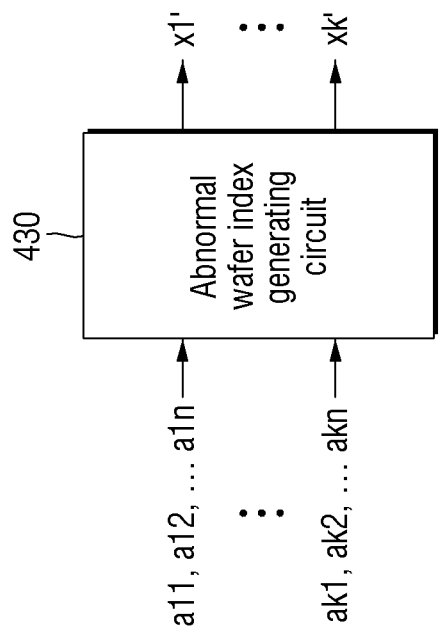
FIG. 8 is a block diagram illustrating the abnormal wafer index generating circuit according to some embodiments.

FIG. 7 is a diagram for explaining a Euclidean distance and a Cosine distance. FIG. 8 is a block diagram illustrating the abnormal wafer index generating circuit according to some embodiments.

Referring to FIG. 5, FIG. 6, FIG. 7 and FIG. 8, the computing apparatus 400 may compute wafer vectors W1v and W2v between the variables (S560). The computing apparatus 400 may include the abnormal wafer index generating circuit 430. The abnormal wafer index generating circuit 430 may receive the first process variable a11 to the $n^{th}$ process variable akn from the wafer variable standardization circuit 420. The abnormal wafer index generating circuit 430 may compute the wafer vectors based on the first process variable a11 to the $n^{th}$ process variable akn. For example, the abnormal wafer index generating circuit 430 may generate a first wafer vector W1v and a second wafer vector W2v, based on a first process variable a11, a second process variable a12, a first process variable a21, and a second process variable a22.

Referring to FIG. 7, the first wafer vector W1v and the second wafer vector W2v may be expressed with respect to the first process variable a1 and the second process variable a2. The first wafer vector W1v may have vector values of the first process variable a11 and the second process variable a12, and the second wafer vector W2v may have vector values of the first process variable a21 and the second process variable a22. Here, the first wafer vector W1v corresponds to the process condition data and the structural measurement data of the first wafer W1, and the second wafer vector W2v may correspond to the process condition data and the structural measurement data of the second wafer W2. That is, the abnormal wafer index generating circuit 430 may compute the first wafer vector W1v and second wafer vector W2v of the first wafer W1 and second wafer W2.

The abnormal wafer index generating circuit 430 may compute the Euclidean distance (S561). Referring to FIG. 7, a first distance D1 may correspond to a distance between the first wafer vector W1v and the second wafer vector W2v. The first distance D1 may be expressed by following Equation 1.

$$D1=\sqrt{(a11-a21)^2+(a12-a11)^2} \qquad \text{<Equation 1>}$$

Further, the first Euclidean distance EUD1 may be expressed by following Equation 2.

$$EUD1=D1=\sqrt{(a11-a21)^2+(a12-a22)^2} \qquad \text{<Equation 2>}$$

Therefore, in the first Euclidean distance EUD1, the first distance D1 may correspond to a distance between the first wafer vector W1v and the second wafer vector W2v, and if the process variable characteristics of the first wafer W1 and the second wafer W2 are different from each other, the first Euclidean distance EUD1 may be large.

Subsequently, the abnormal wafer index generating circuit 430 may compute the Cosine distance (S562). A first angle θ1 may correspond to an angle between the first wafer vector W1v and the second wafer vector W2v. The first angle θ1 may be expressed by following Equation 3.

$$\theta 1 = \frac{W1v \cdot W2v}{|W1v| \cdot |W2v|} \qquad \text{<Equation 3>}$$

Further, the first Cosine distance COD1 may be expressed by following Equation 4.

$$COD1=1-COS\ \theta 1 \qquad \text{<Equation 4>}$$

That is, if the characteristics of the first wafer W1 and the characteristics of the second wafer W2 are similar, the first angle θ1 may be small. Also, the Cosine distance COD1 may approach zero according to Equation 4. That is, if the characteristics of the process variables of the first wafer W1 and the second wafer W2 are different, the first Cosine distance COD1 may be large.

In summary, if the characteristics of the process variables of the first wafer W1 and the second wafer W2 are different, the first Euclidean distance EUD1 and the first Cosine distance COD1 may be large. However, if the characteristics of the process variables of the first wafer W1 and the second wafer W2 are similar, the first Euclidean distance EUD1 and the first Cosine distance COD1 may be small.

Subsequently, the abnormal wafer index generating circuit 430 may calculate abnormal wafer indexes x1' to xk' of the wafer, and normalize the abnormal wafer indexes x1' to xk' (S563). The first abnormal wafer index x1' generated based on the first wafer vector W1v and the second wafer vector W2v shown in FIG. 7 may be calculated using following Equation 5.

$$x1'=EUD1*COD1 \qquad \text{<Equation 5>}$$

That is, the first abnormal wafer index x1' may correspond to the product of the first Euclidean distance EUD1 and the first Cosine distance COD1. In the present embodiment, the abnormal wafer index generating circuit 430 may generate the first abnormal wafer index x1' based on the first wafer vector W1v and the second wafer vector W2v.

Figure 9:
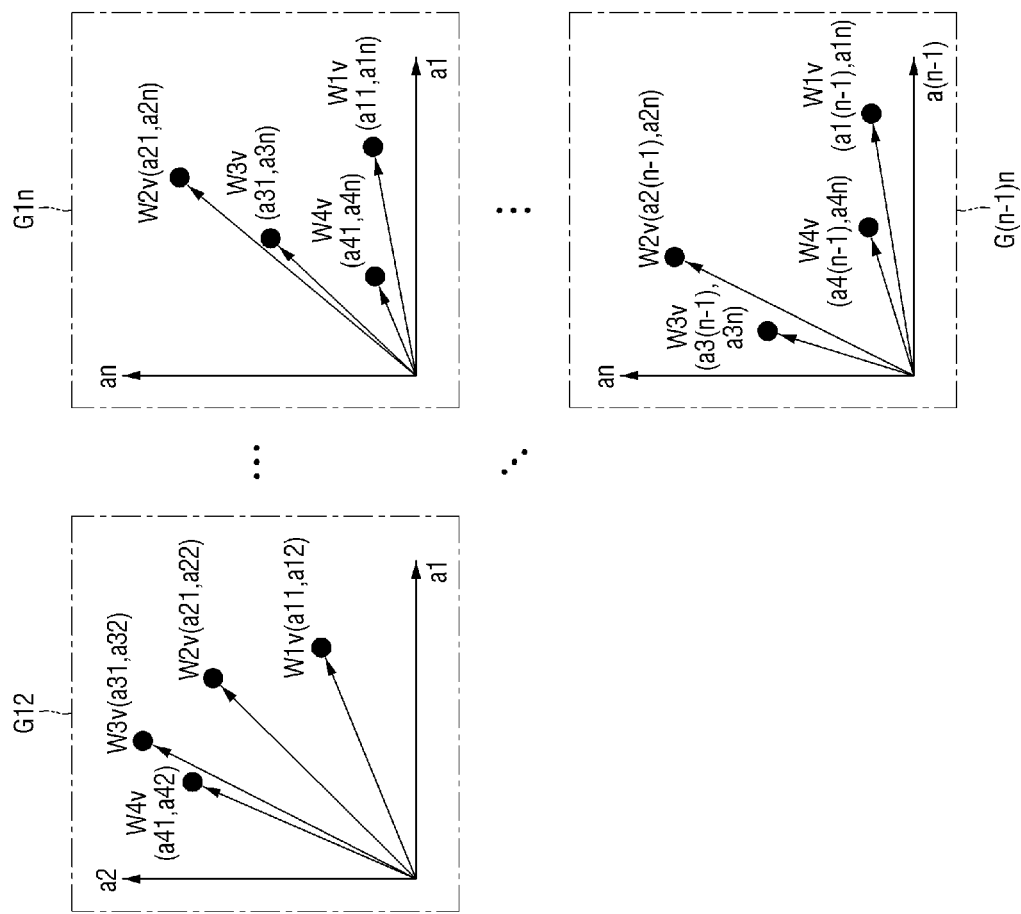
FIG. 9 is a diagram for explaining wafer vectors for a plurality of process variables of the plurality of wafers.

FIG. 9 is a diagram for explaining wafer vectors for a plurality of process variables of the plurality of wafers.

Referring to FIG. 8 and FIG. 9, the abnormal wafer index generating circuit 430 may generate a plurality of abnormal wafer indexes x1' to xk' based on the plurality of process variables a11 to akn.

A graph G12 shown in FIG. 9 shows first vector W1v to fourth vector W4v. The first vector W1v to the fourth vector W4v may correspond to the vectors of the first process variable a1 and the second process variable a2. The abnormal wafer index generating circuit 430 may generate abnormal wafer indexes x1' to x4' based on the first vector W1v to the fourth vector W4v. That is, the abnormal wafer index generating circuit 430 may generate a plurality of abnormal wafer indexes x1' to xk' based on a plurality of vectors. A graph G1n represents the first vector W1v to the fourth vector W4v of the first process variable a1 and the nth process variable an, and a graph G(n−1)n represents first vector W1v to the fourth vector W4v of the $(n-1)^{th}$ process variable a(n−1) and the $n^{th}$ process variable an. That is, the abnormal wafer index generating circuit 430 may generate a plurality of abnormal wafer indexes x1' to xk' based on a plurality of vectors of the plurality of process variables a1 to an.

For example, the first abnormal wafer index x1' may be expressed by following Equation 6.

$$x1' = \frac{2}{i}\left[\sum_{k=1}^{i}\left[\sum_{k,j=3,i\neq j}^{n} \{EUD1(i,j)*COD1(i,j)\}\right]\right] \qquad \text{<Equation 6>}$$

Further, the $k^{th}$ abnormal wafer index xk' may be expressed by following Equation 7.

$$xk' = \frac{1}{i}\left[\sum_{k=1}^{i}\left[\sum_{k,j=1,i\neq j}^{n} \{EUDk(i,j)*CODk(i,j)\}\right]\right] \qquad \text{<Equation 7>}$$

As described through the aforementioned contents, the abnormal wafer index generating circuit 430 may generate abnormal wafer indexes x1' to xk' of the wafers W1 to Wk based on the product of the Euclidean distance EUD and the Cosine distance COD. However, embodiments of the present disclosure are not limited thereto, and the abnormal wafer indexes x1' to xk' may be calculated through other methods.

Figure 10B:
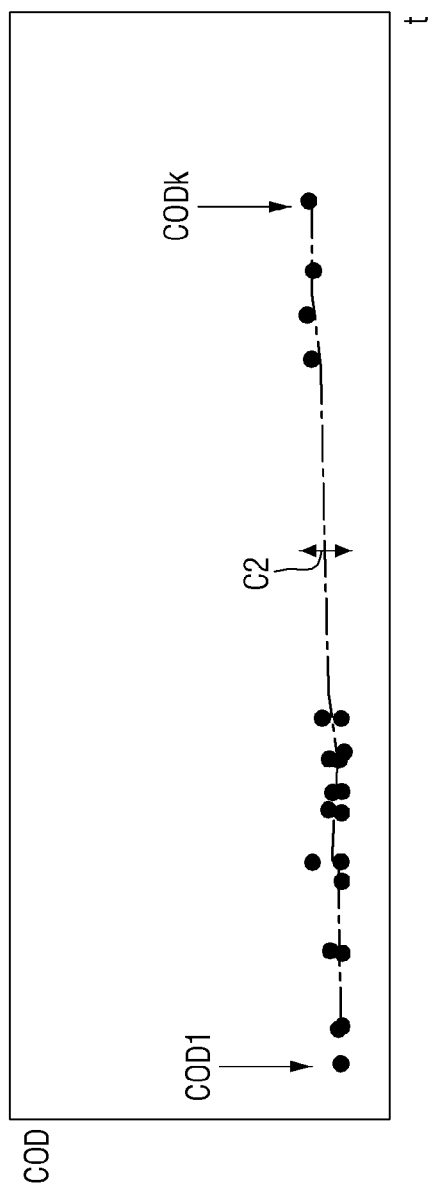

FIG. 10a, FIG. 10b and FIG. 10c are diagrams for explaining the Euclidean distance, the Cosine distance and the abnormal wafer index.

Referring to FIG. 10a, the graph shows the Euclidean distance EUD of the plurality of wafers W1 to Wk. The first Euclidean distance EUD1 may be a value corresponding to the first wafer W1, and the $k^{th}$ Euclidean distance EUDk may be a value corresponding to the $k^{th}$ wafer Wk. Here, the $k^{th}$ wafer Wk may be a wafer generated later than the first wafer W1.

Referring to FIG. 10b, the graph shows the Cosine distance COD of the plurality of wafers W1 to Wk. The first Cosine distance COD1 may be a value corresponding to the first wafer W1, and the $k^{th}$ Cosine distance CODk may be a value corresponding to the $k^{th}$ wafer Wk.

Referring to FIG. 10c, the graph shows an abnormal wafer index x' of the plurality of wafers W1 to Wk. The first abnormal wafer index x1' may be a value corresponding to the first wafer W1, and the $k^{th}$ abnormal wafer index xk' may be a value corresponding to the $k^{th}$ wafer Wk.

Referring to FIG. 10a, FIG. 10b and FIG. 10c, a difference c3 between the first abnormal wafer index x1' and the $k^{th}$ abnormal wafer index xk' may be greater than a difference c1 between the first Euclidean distance EUD1 and the $k^{th}$ Euclidean distance EUDk, and may be greater than a difference c2 between the first Cosine distance COD1 and the $k^{th}$ Cosine distance CODk. That is, in some embodiments of the present disclosure, a significant difference between the wafers when using the abnormal wafer index x' is greater than the significant difference between the wafers when using only the Euclidean distance EUD, and may be greater than the significant difference between wafers when using only the Cosine distance COD. Therefore, the wafer defect test system 1 may distinguish the characteristics of the wafers (for example, process conditions or structural measurement data) and predict the defective wafer.

Figure 11B:
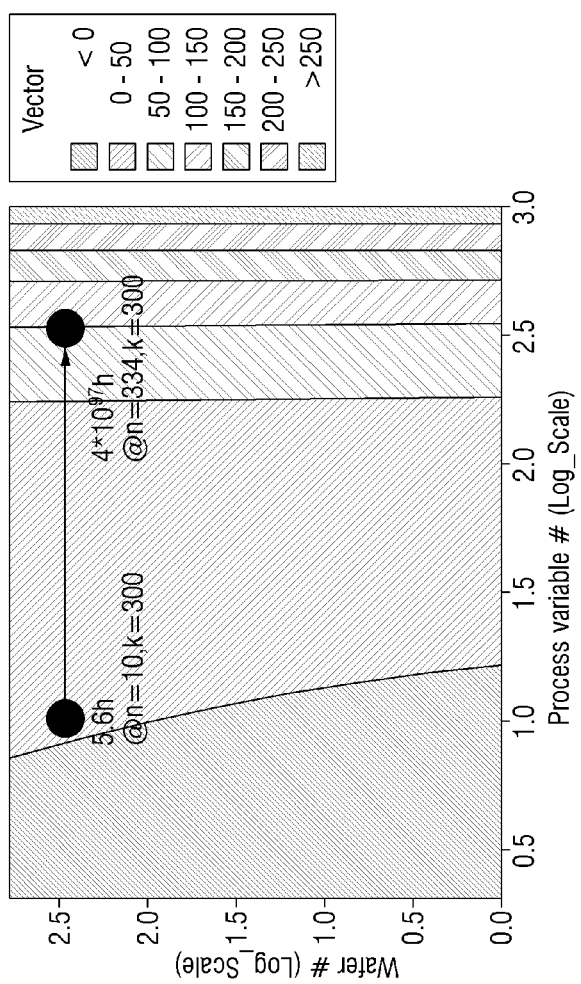

FIG. 11a, FIG. 11b and FIG. 11c are diagrams for explaining the wafer defect prediction simulation time.

Referring to FIG. 11a, the simulation time of the existing SHAP model used for wafer defect prediction and a vector similarity model according to some embodiments of the present disclosure is shown. When the number of output wafers is k and the number of process variables is n, a computing amount of the existing model may correspond to $2^n*k*13$, and the simulation time may correspond to 5.6 hours. However, the computing amount of the model according to some embodiments of the present disclosure may correspond to $n*(n-1)*k$, and the simulation time may correspond to 5 minutes. That is, the simulation time of the model according to some embodiments of the present disclosure may be shorter than the simulation time of the existing model. Therefore, an efficient wafer fabricating process may be performed, by shortening the wafer defect prediction simulation time required in the wafer fabricating process.

FIG. 11b shows a change in simulation time of the existing model depending on the number of process variables in which the simulation is performed. When the number of process variables is 10, the simulation time of the existing model is 5.6 hours. However, when the number of process variables is 334, the simulation time of the existing model may be $4*10^{97}$ hours. That is, in the existing model, the simulation time may increase exponentially as the number of process variables increases.

FIG. 11c shows a change in simulation time of the model according to some embodiments of the present disclosure depending on the number of process variables in which the simulation is performed. When the number of process variables is 10, the simulation time of the model according to some embodiments of the present disclosure is 5 minutes. However, when the number of process variables is 334, the simulation time of the model according to some embodiments of the present disclosure may be 83 hours. Since the simulation time is shortened for a variety of scenarios with different numbers of process variables in this way, an efficient wafer fabricating process may be performed. That is, the simulation time of the wafer defect test system 1 using the abnormal wafer index x', which is the product of the Euclidean distance EUD and the Cosine distance COD, may be shortened.

Figure 12:
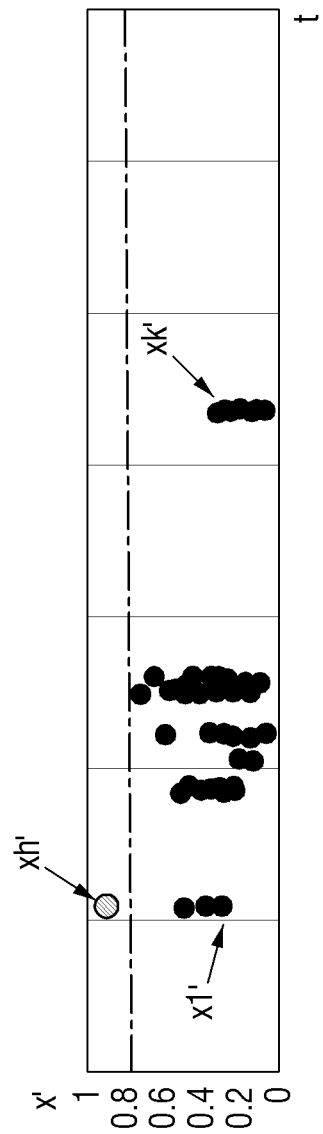
FIG. 12 is a diagram for explaining that the defective wafer is detected, using the abnormal wafer index according to some embodiments.

FIG. 12 is a diagram for explaining that the defective wafer is detected, using the abnormal wafer index according to some embodiments.

FIG. 12 shows the abnormal wafer indexes x' of the wafers W1 to Wk fabricated over time. The first abnormal wafer index x1' may correspond to the first wafer W1, the $h^{th}$ abnormal wafer index xh' may correspond to a $h^{th}$ wafer Wh, and the $k^{th}$ abnormal wafer index xk' may correspond to the $k^{th}$ wafer Wk.

Some of the plurality of abnormal wafer indexes x' may be below the threshold value, and some others of the plurality of abnormal wafer indexes x' may exceed the threshold value. For example, the $h^{th}$ abnormal wafer index xh' may correspond to a value exceeding the threshold value. Here, the determination standard of the abnormal wafer may correspond to a wafer that deviates from 2.5% of the normal distribution of the abnormal wafer indexes x'. In this way, the computing apparatus 400 may detect and predict that the $h^{th}$ wafer Wh is an abnormal wafer, using the $h^{th}$ abnormal wafer index xh'. Further, the wafer defect test system 1 may check that the $h^{th}$ wafer Wh is an abnormal wafer, using the first characteristic variable b11 to the $j^{th}$ characteristic variable bkj.

A wafer defect test system 1 according to another embodiment will be described referring to FIG. 13, FIG. 14 and FIG. 15.

Figure 13:
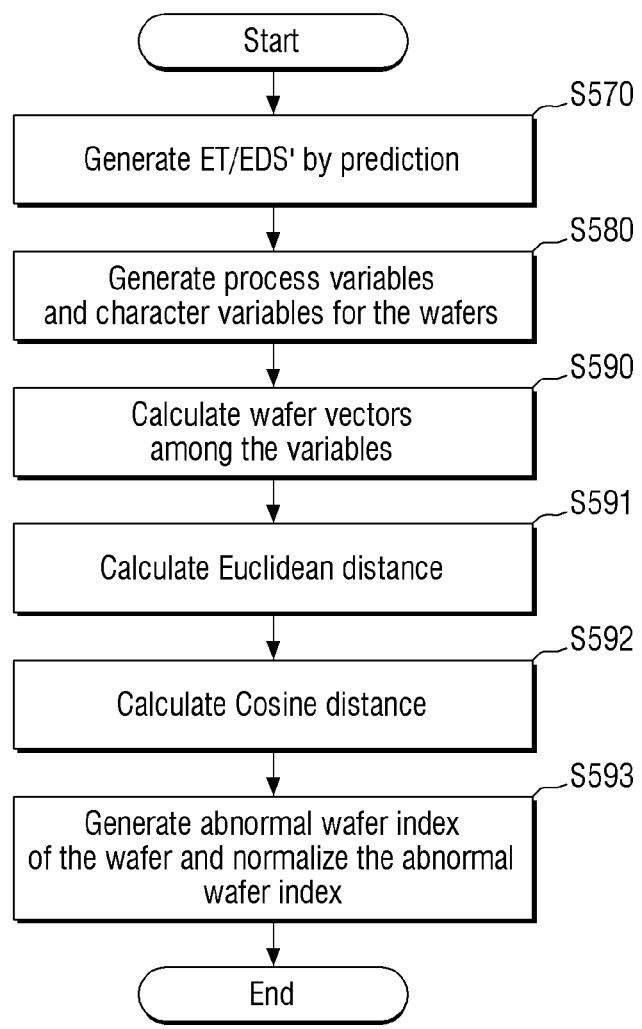
FIG. 13 is a flowchart illustrating a method for generating the abnormal wafer index which considers the predicted semiconductor element characteristic data according to some embodiments.

FIG. 13 is a flowchart illustrating a method for generating the abnormal wafer index which considers the predicted semiconductor element characteristic data according to some embodiments. FIG. 14 and FIG. 15 are block diagrams for explaining the generation of the abnormal wafer index of FIG. 13.

Figure 14:
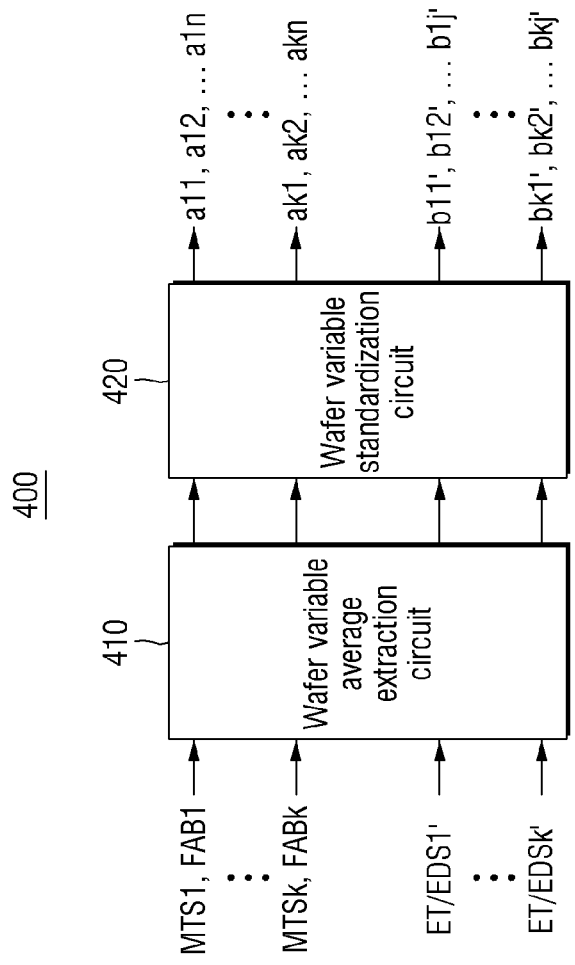
FIG. 14 and FIG. 15 are block diagrams for explaining the generation of the abnormal wafer index of FIG. 13.
Figure 15:
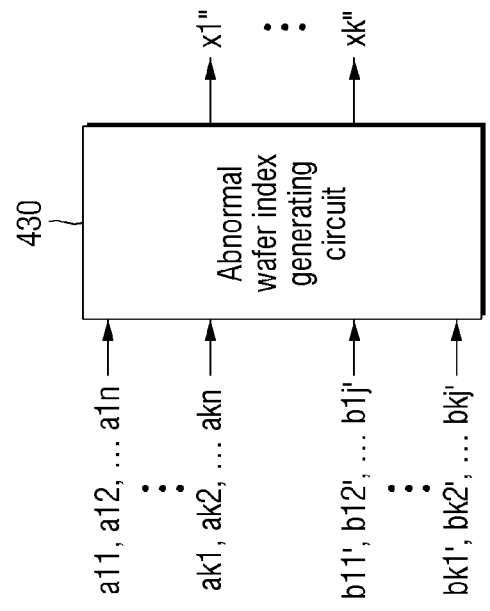

Referring to FIG. 13, FIG. 14 and FIG. 15, the wafer defect test system 1 may generate predicted semiconductor element characteristic data ET/EDS' through prediction (S570). For example, the wafer defect test system 1 may generate the first predicted semiconductor element characteristic data ET/EDS 1' to the $k^{th}$ predicted semiconductor element characteristic data ET/EDSk', by performing the result prediction on the first wafer W1 to the $k^{th}$ wafer Wk. Further, the first predicted semiconductor element characteristic data ET/EDS 1' to the $k^{th}$ predicted semiconductor element characteristic data ET/EDSk' may be provided to the computing apparatus 400.

The wafer variable average extraction circuit 410 and the wafer variable standardization circuit 420 may generate process variables and characteristic variables for each wafer (S580). Here, the wafer variable average extraction circuit 410 and the wafer variable standardization circuit 420 may generate the first prediction characteristic variable b11' to the $k^{th}$ prediction characteristic variable bkj', based on the first predicted semiconductor element characteristic data ET/EDS 1' to the $k^{th}$ predicted semiconductor element characteristic data ET/EDSk'. The first prediction characteristic variable b11' to the $k^{th}$ prediction characteristic variable bkj' may correspond to the fabricated first wafer W1 to $k^{th}$ wafer Wk.

The abnormal wafer index generating circuit 430 may calculate the wafer vectors between the variables (S590).

For example, the abnormal wafer index generating circuit 430 may generate a plurality of abnormal wafer indexes x1" to xk" based on the first prediction characteristic variable b11' to the $k^{th}$ prediction characteristic variable bkj' and the first process variable a11 to the $n^{th}$ process variables akn. Here, the abnormal wafer indexes x1" to xk" may be different from the abnormal wafer indexes x1' to xk' described above. That is, the abnormal wafer index generating circuit 430 may generate the abnormal wafer indexes x1" to xk" additionally in consideration of the first prediction characteristic variable b11' to $k^{th}$ prediction characteristic variable bkj'.

The abnormal wafer index generating circuit 430 may calculate the Euclidean distance EUD (S591) and may calculate the Cosine distance COD (S592). Further, abnormal wafer index generating circuit 430 may generate the abnormal wafer indexes x1" to xk" of the wafer and normalize the abnormal wafer indexes x1" to xk" (S593).

Here, the abnormal wafer indexes x1" to xk" may correspond to the abnormal wafer index generated by additionally considering the first prediction characteristic variable b11' to the $k^{th}$ prediction characteristic variable bkj'. Therefore, the wafer defect test system 1 having high accuracy may be provided, by generating the abnormal wafer index in consideration of more variables.

As an example, the abnormal wafer index generating circuit 430 may receive a second characteristic variable, which is a prediction test result of the first wafer, and generate a fourth wafer vector of at least two among the first process variable, the second process variable, and the second characteristic variable. The abnormal wafer index generating circuit 430 may generate a third abnormal wafer index of the first wafer, based on the product of an Euclidean distance and a Cosine distance between the second wafer vector and the fourth wafer vector.

Figure 16:
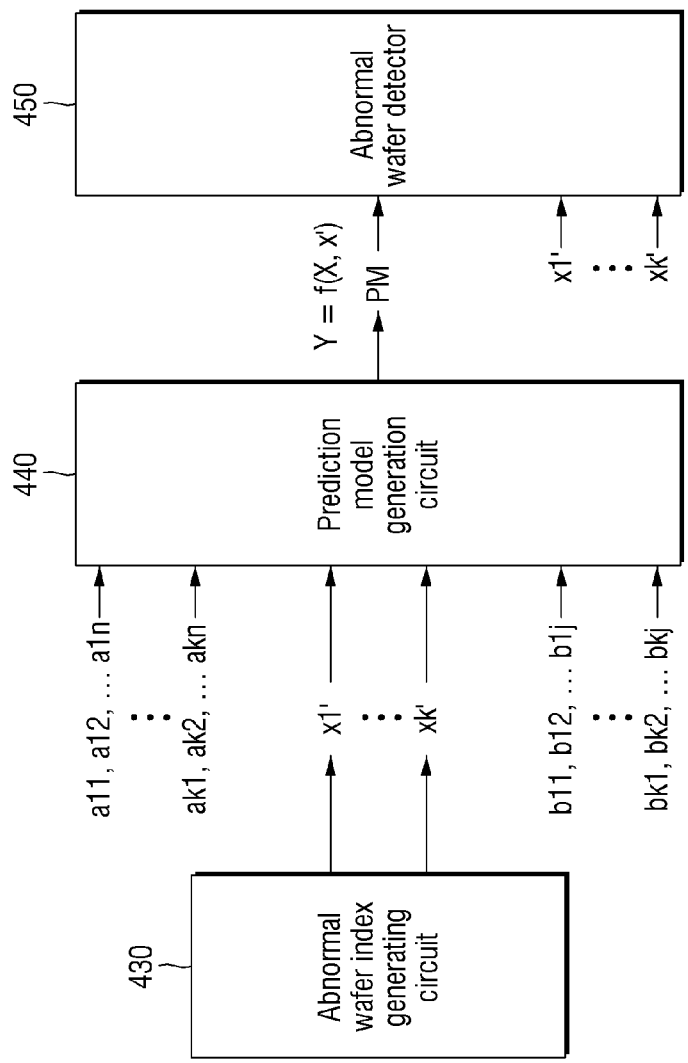
FIG. 16 is a block diagram for explaining the generation of the wafer defect prediction model according to some embodiments.

FIG. 16 is a block diagram for explaining the generation of the wafer defect prediction model according to some embodiments.

Referring to FIG. 16, the computing apparatus 400 may include a prediction model generating circuit 440 and an abnormal wafer detector 450.

The prediction model generating circuit 440 may receive the first process variable a11 to the $n^{th}$ process variable akn, and the first characteristic variable b11 to the $j^{th}$ characteristic variable bkj, and may receive the first abnormal wafer index x1' to the $k^{th}$ abnormal wafer index xk' from the abnormal wafer index generating circuit 430. Here, the first characteristic variable b11 to the $j^{th}$ characteristic variable bkj may correspond to the results of testing the first wafer W1 to the $k^{th}$ wafer Wk.

The prediction model generating circuit 440 may generate a wafer defect prediction model PM, based on the first process variable a11 to the $n^{th}$ process variable akn, first characteristic variable b11 to $j^{th}$ characteristic variable bkj, and first abnormal wafer index x1' to the $k^{th}$ abnormal wafer index xk'. The prediction model generating circuit 440 may generate a wafer defect prediction model PM through regression using a neural network. Here, the wafer defect prediction model PM may be represented by Y=f(X,x'). Here, Y corresponds to the output variable, and X and x' correspond to the input variable. The input variable X may correspond to the first process variable a11 to the $n^{th}$ process variable akn, and x' may correspond to the first abnormal wafer index x1' to the $k^{th}$ abnormal wafer index xk'. Further, Y which is an output variable may correspond to the first characteristic variable b11 to the $j^{th}$ characteristic variable bkj.

By utilizing the first abnormal wafer index x1' to the $k^{th}$ abnormal wafer index xk' as input variables, the prediction model generating circuit 440 may further improve the classification performance of the characteristics to the wafers W1 to Wk. For example, even if different wafers have the same process variable, different characteristic variables may be output because the abnormal wafer indexes are different. That is, a wafer defect prediction model PM may be generated, by performing learning, using the first process variable a11 to the $n^{th}$ process variable akn, the first characteristic variable b11 to the $j^{th}$ characteristic variable bkj, and the first abnormal wafer index x1' to the $k^{th}$ abnormal wafer index xk'. Further, the wafer defect prediction model PM may automatically classify the characteristics of the wafers W1 to Wk, by utilizing the abnormal wafer index x' which is the product of the Euclidean distance EUD and the Cosine distance COD.

The prediction model generating circuit 440 may provide the wafer defect prediction model PM to the abnormal wafer detector 450. Further, the abnormal wafer detector 450 may receive the first wafer index x1' to the $k^{th}$ wafer index xk'.

Figure 17:
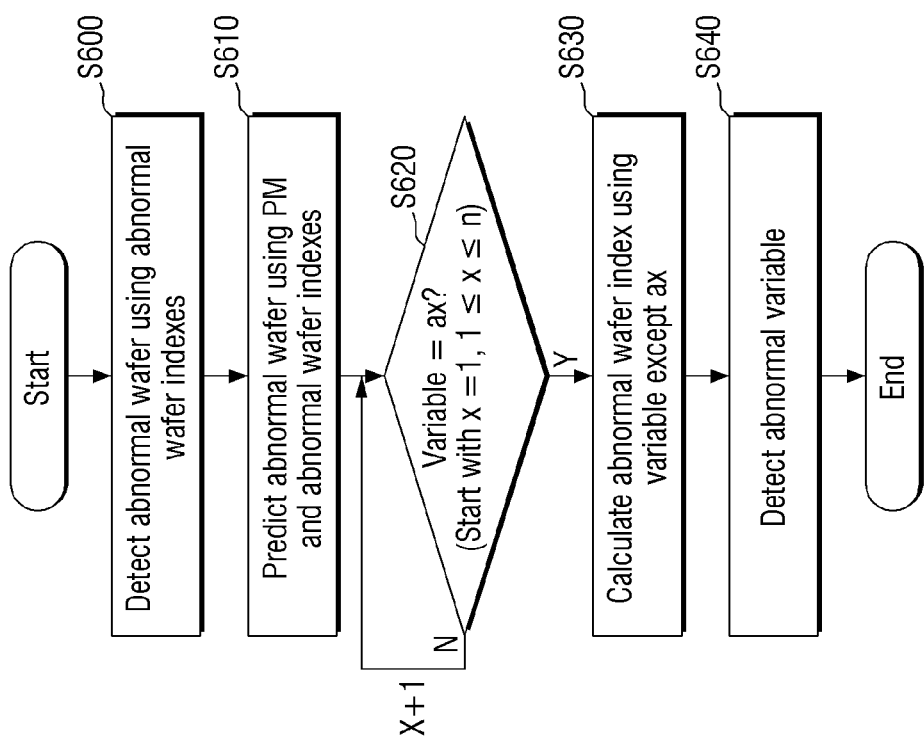
FIG. 17 is a flowchart illustrating a method for deriving the influence of the abnormal wafer for each variable.

FIG. 17 is a flowchart illustrating a method for deriving the influence of the abnormal wafer for each variable.

Referring to FIG. 17, the abnormal wafer detector 450 may detect an abnormal wafer, using the abnormal wafer index x' (S600). This operation corresponds to detecting that the $h^{th}$ wafer Wh is an abnormal wafer by utilizing the abnormal wafer index xh' described referring to FIG. 12. Although this operation may be omitted, the embodiments of the present disclosure are not limited thereto.

The abnormal wafer detector 450 may predict an abnormal wafer, using the wafer defect prediction model PM and the abnormal wafer index x' (S610). The abnormal wafer detector 450 may detect an abnormal wafer, using the first process variable a11 to the $n^{th}$ process variable akn and the abnormal wafer index x1' to xk' as input, on the wafer defect prediction model PM generated by the prediction model generating circuit 440. Therefore, it is possible to detect which of the first wafer W1 to the $k^{th}$ wafer Wk is defective. In this embodiment, the description will be provided on the assumption that the $h^{th}$ wafer Wh is defective.

Subsequently, the abnormal wafer detector 450 may detect what is the defect factor of the $h^{th}$ wafer Wh. The abnormal wafer detector 450 may check whether the process variable is the $x^{th}$ process variable ax (S620). When the process variable is not the $x^{th}$ process variable ax (S620-N), the abnormal wafer detector 450 may check whether the process variable is the $(x+1)^{th}$ process variable a(x+1). When the process variable is the $x^{th}$ process variable ax (S620-Y), the abnormal wafer detector 450 may calculate the abnormal wafer index x', using variables other than the $x^{th}$ process variable ax (S630).

For example, the abnormal wafer detector 450 may calculate the abnormal wafer index x', using variables other than the first process variable ah1 (for example, the second to $n^{th}$ process variables ah2 to ahn, and the first characteristic variable bh1 to the $j^{th}$ characteristic variable bhj). Accordingly, the abnormal wafer detector 450 may detect the abnormal variable (S640).

For example, when the $h^{th}$ abnormal wafer index xh' is determined to be abnormal, the abnormal wafer detector 450 may determine which of the respective process variables is the cause. When the $h^{th}$ abnormal wafer index xh' is calculated using variables other than the first process variable ah1, the abnormal wafer detector 450 may determine whether the $h^{th}$ abnormal wafer index xh' is the cause of the abnormality. For example, if the $h^{th}$ abnormal wafer index xh' still deviates from the normal distribution 2.5% of the abnormal wafer indexes x', the first process variable ah1 may not be the cause of the abnormality. Further, when the $h^{th}$ abnormal wafer index xh' does not deviate from the normal distribution 2.5% of the abnormal wafer indexes x', the first process variable ah1 may be determined to be the cause of the abnormality.

Although the abnormal variable may be detected through such a method, the abnormal wafer detector 450 according to some embodiments of the present disclosure may detect the abnormal variable through another method. The computing apparatus 400 may provide feedback data regarding the abnormal variables to the semiconductor fabrication apparatus 100 to provide feedback on the wafer fabricating process.

FIG. 18a, FIG. 18b, FIG. 18c and FIG. 18d are diagrams for explaining the influence of the abnormal wafer for each variable.

Figure 18A:
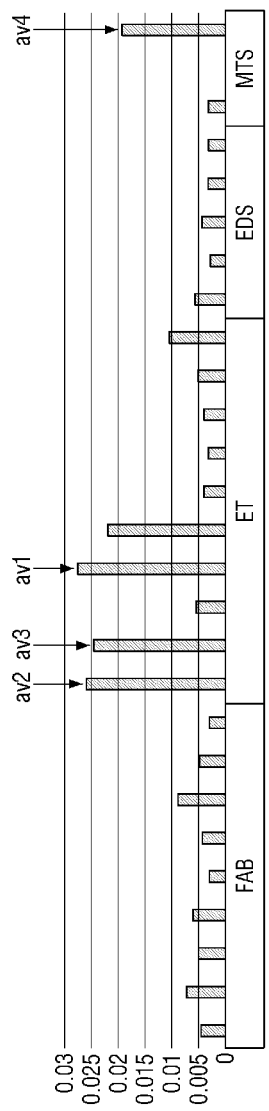
FIG. 18a, FIG. 18b, FIG. 18c and FIG. 18d are diagrams for explaining the influence of the abnormal wafer for each variable.
Figure 18B:
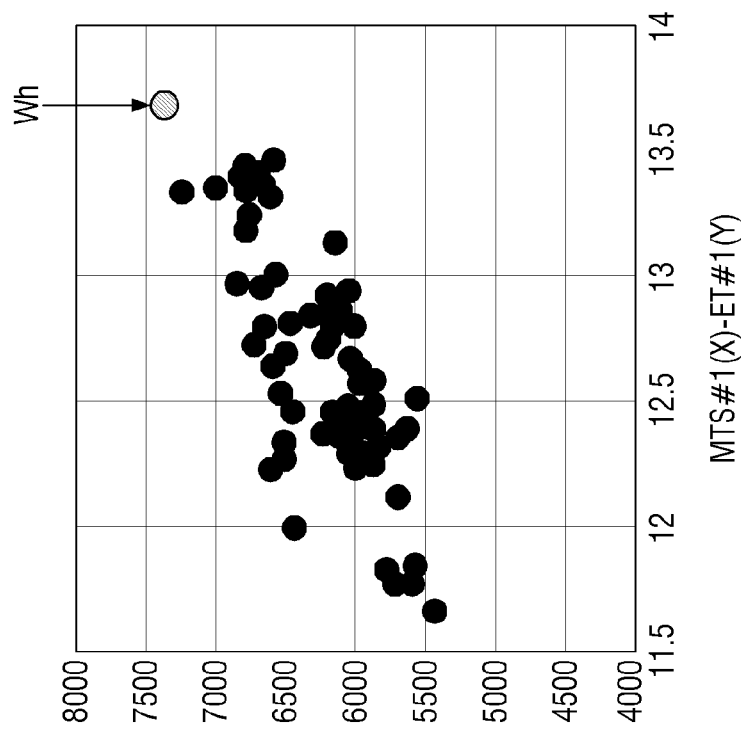
Figure 18C:
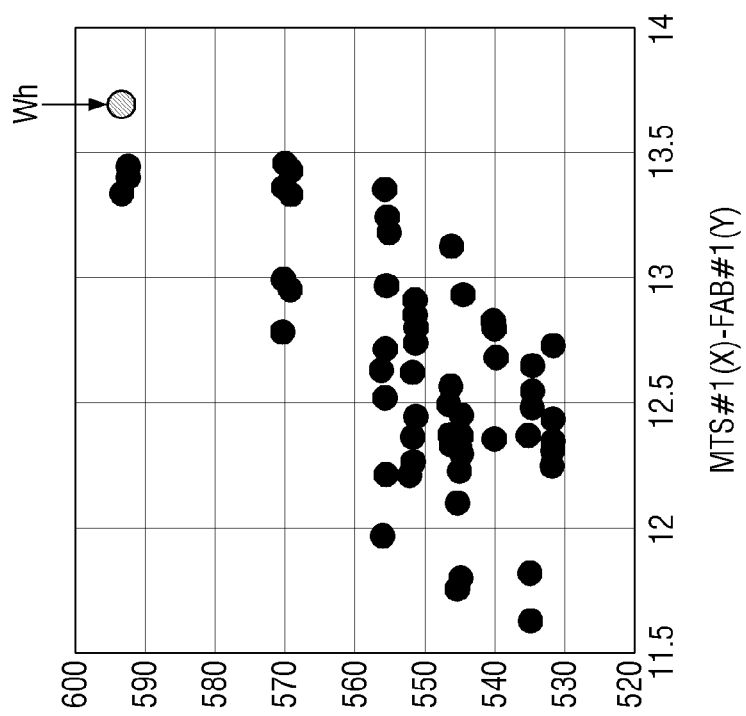
Figure 18D:
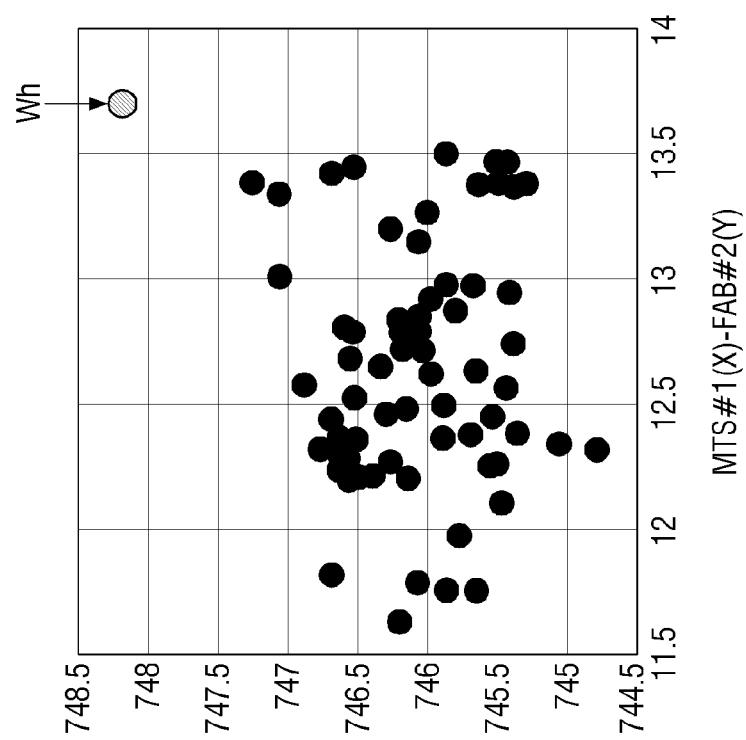

Referring to FIG. 18a, the first abnormal variable av1 to the fourth abnormal variable av4 may correspond to the cause of the abnormality of the $h^{th}$ wafer Wh. The abnormal wafer detector 450 may provide the data of the first abnormal variable av1 to the fourth abnormal variable av4 to the semiconductor fabrication apparatus 100. Referring to FIG. 18b, FIG. 18c and FIG. 18d, the abnormal wafer index of the $h^{th}$ wafer wh may be different from other abnormal wafer indexes.

Figure 19:
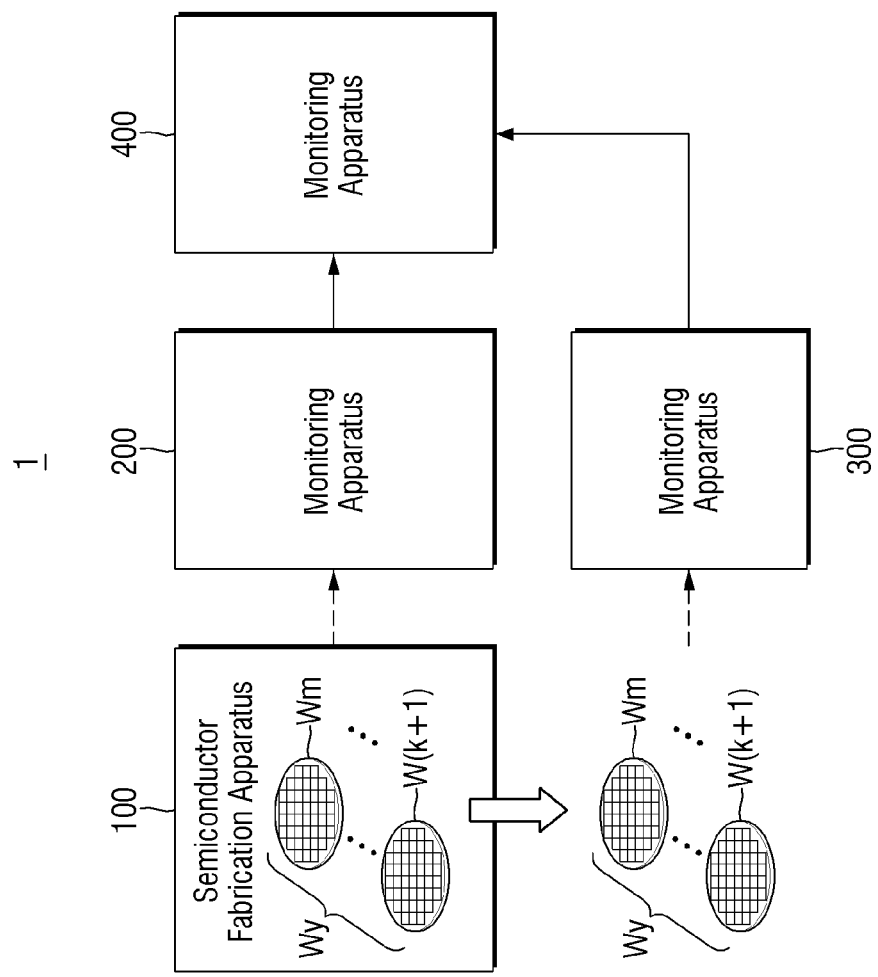
FIG. 19 is a block diagram for explaining a method for fabricating the second wafer group according to some embodiments.

FIG. 19 is a block diagram for explaining a method for fabricating the second wafer group according to some embodiments.

Referring to FIG. 19, the wafer defect test system 1 may test a wafer defect prediction model PM, using the second wafer group Wy. Here, the second wafer group Wy may be fabricated following the first wafer group Wx as described in the descriptions of drawings from FIG. 1 to FIG. 18d. That is, the second wafer group Wy may be tested after the wafer defect prediction model PM is generated. Among the first wafer group Wx and second wafer group Wy, the first wafer group Wx may correspond to 70%, and the second wafer group Wy may correspond to 30%.

The semiconductor fabrication apparatus 100 may fabricate the second wafer group Wy, and the monitoring apparatus 200 may monitor the wafers of the second wafer group Wy being fabricated. Further, the monitoring apparatus 200 may generate the structural measurement data and the process condition data of the second wafer group Wy and provide them to the computing apparatus 400. The test apparatus 300 may perform a test on the fabricated wafers of the second wafer group Wy, generate semiconductor element characteristic data, and provide them to the computing apparatus 400.

The computing apparatus 400 may convert the structural measurement data and process condition data into process variables, and convert the semiconductor element characteristic data into characteristic variables for use. The abnormal wafer detector 450 of the computing apparatus 400 may predict a defective wafer, using the wafer defect prediction model PM. That is, the abnormal wafer detector 450 may predict a defective wafer, using the process variable and the abnormal wafer index as input, on the wafer defect prediction model PM. The computing apparatus 400 may check the accuracy of the wafer defect prediction model PM, by checking the predicted defective wafer and the generated characteristic variable.

Figure 20:
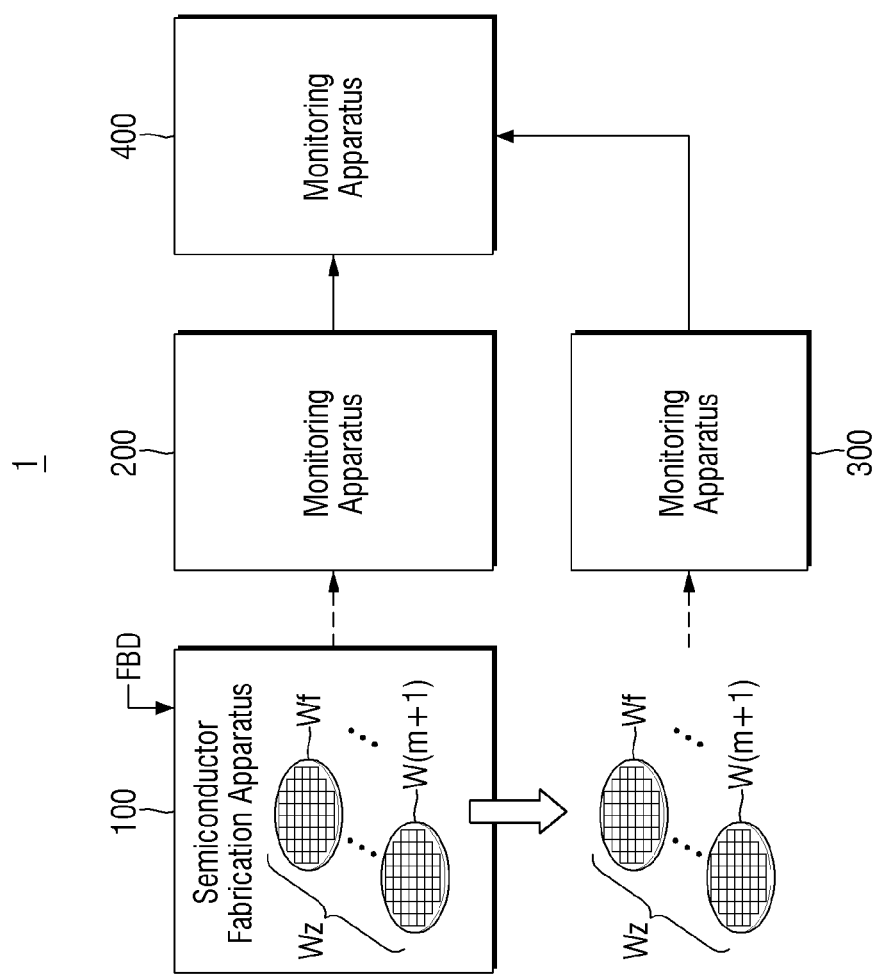
FIG. 20 is a block diagram for explaining a method for fabricating a third wafer group according to some embodiments.
Figure 21:
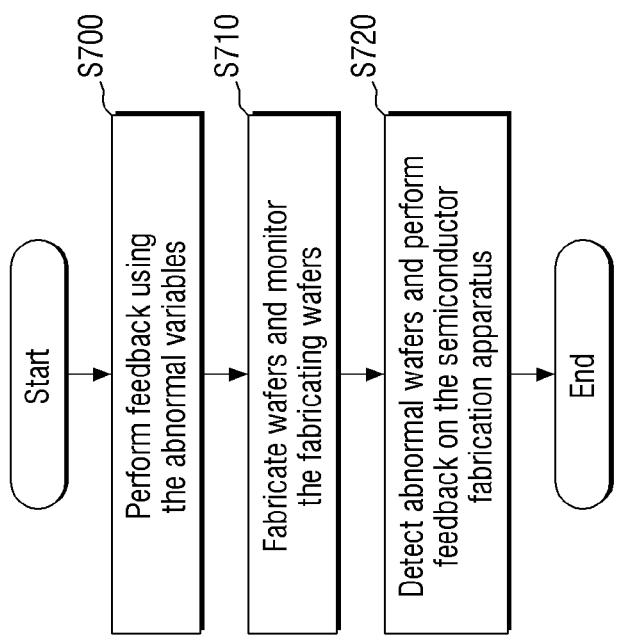
FIG. 21 is a flowchart for explaining the method for fabricating the third wafer group of FIG. 20.

FIG. 20 is a block diagram for explaining a method for fabricating a third wafer group according to some embodiments. FIG. 21 is a flowchart for explaining the method for fabricating the third wafer group of FIG. 20.

Referring to FIG. 20 and FIG. 21, a third wafer group Wz may be different from the first wafer group Wx and second wafer group Wy. The third wafer group Wz may be fabricated following the first wafer group Wx and second wafer group Wy. That is, a time period at which the third wafer group Wz is fabricated may correspond to a time period after the wafer defect prediction model PM is generated and the test thereof is performed and verified.

The semiconductor fabrication apparatus 100 may receive feedback data FBD from the computing apparatus 400. Here, the feedback data FBD may correspond to the data derived in the process in which the computing apparatus 400 generates the wafer defect prediction model PM and the process in which the abnormal wafer is detected through the abnormal wafer index x'. The semiconductor fabrication apparatus 100 may perform feedback, by referring to the abnormal variables av1 to av4 included in the feedback data FBD (S700).

The wafer defect test system 1 may fabricate a wafer and monitor the wafer being fabricated (S710). For example, the semiconductor fabrication apparatus 100 may fabricate wafers of the third wafer group Wz by performing the feedback. Further, the monitoring apparatus 200 may monitor the wafers of the third wafer group Wz being fabricated. Therefore, the monitoring apparatus 200 may provide the structural measurement data and the process condition data of the third wafer group Wz to the computing apparatus 400. At this time, the computing apparatus 400 may detect the wafer predicted to be defective, using the wafer defect prediction model PM, by utilizing the process variables and the abnormal wafer index x' generated through the process variables as inputs. Further, the computing apparatus 400 may detect a defect factor of the wafer which is predicted to be defective. Therefore, the computing apparatus 400 may generate feedback data regarding the defective wafer.

The computing apparatus 400 may detect the abnormal wafers and perform feedback on the semiconductor fabrication apparatus 100 (S720). The computing apparatus 400 may provide information on the abnormality prediction wafer and defect factor information to the semiconductor fabrication apparatus 100, and the semiconductor fabrication apparatus 100 may fabricate the wafer of the third wafer group Wz by referring to the information. A wafer defect can decrease and a wafer yield can increase, accordingly.

In concluding the detailed explanation, those skilled in the art will appreciate that many variations and modifications may be made to the preferred embodiments without substantially departing from the principles of the present disclosure. Therefore, the disclosed embodiments are described in a generic and descriptive sense only and not for purposes of limitation.

What is claimed is:

1. A wafer defect test apparatus, comprising:
a wafer variable generator configured to:
receive a first structural measurement data and a first process condition data of a first wafer, and a second structural measurement data and a second process condition data of a second wafer;
generate a first process variable and a second process variable based on the first structural measurement data and the first process condition data; and
generate a third process variable and a fourth process variable based on the second structural measurement data and the second process condition data;
an abnormal wafer index generating circuit configured to:

generate a first wafer vector of the first process variable and the second process variable;
generate a second wafer vector of the third process variable and the fourth process variable;
calculate a first Euclidean distance between the first wafer vector and the second wafer vector;
calculate a first Cosine distance between the first wafer vector and the second wafer vector; and
generate a first abnormal wafer index of the first wafer based on a product of the first Euclidean distance and the first Cosine distance;
a prediction model generating circuit configured to:
receive a first characteristic variable that is a test result of the first wafer;
generate a wafer defect prediction model through a regression based on the first process variable, the second process variable, the first characteristic variable, and the first abnormal wafer index; and
an abnormal wafer detector configured to test whether the first wafer is defective based on the wafer defect prediction model and the first abnormal wafer index.

2. The wafer defect test apparatus of claim 1, wherein the first abnormal wafer index is proportional to the product of the first Euclidean distance and the first Cosine distance.

3. The wafer defect test apparatus of claim 1, wherein the wafer variable generator is configured to generate a fifth process variable and a sixth process variable based on a third structural measurement data and a third process condition data of a third wafer different from the first wafer and the second wafer, and
wherein the abnormal wafer index generating circuit is configured to generate a third wafer vector of the fifth process variable and the sixth process variable.

4. The wafer defect test apparatus of claim 3, wherein the abnormal wafer index generating circuit is configured to:
calculate a second Euclidean distance between the first wafer vector and the third wafer vector;
calculate a second Cosine distance between the first wafer vector and the third wafer vector; and
generate a second abnormal wafer index of the first wafer based on a product of the second Euclidean distance and the second Cosine distance.

5. The wafer defect test apparatus of claim 4, wherein the prediction model generating circuit is configured to generate a wafer defect prediction model based on the first process variable, the second process variable, the first characteristic variable, the first abnormal wafer index, and the second abnormal wafer index.

6. The wafer defect test apparatus of claim 1, wherein the abnormal wafer index generating circuit is configured to:
receive a second characteristic variable, which is a prediction test result of the first wafer; and
generate a fourth wafer vector of at least two among the first process variable, the second process variable, and the second characteristic variable.

7. The wafer defect test apparatus of claim 6, wherein the abnormal wafer index generating circuit is configured to generate a third abnormal wafer index of the first wafer based on the product of an Euclidean distance and a Cosine distance between the second wafer vector and the fourth wafer vector.

8. The wafer defect test apparatus of claim 1, wherein the prediction model generating circuit is configured to generate the wafer defect prediction model using the first process variable, the second process variable, and the first abnormal wafer index as an input, and using the first characteristic variable as an output.

9. A wafer defect test system, comprising:
a monitoring apparatus configured to monitor a first wafer, a second wafer, and a third wafer being fabricated; and
a computing apparatus connected to the monitoring apparatus,
wherein the monitoring apparatus is configured to:
monitor the first wafer and generate a first process variable and a second process variable;
monitor the second wafer and generate a third process variable and a fourth process variable; and
monitor the third wafer and generate a fifth process variable and a sixth process variable, and
wherein the computing apparatus is configured to:
generate a first wafer vector of the first process variable and the second process variable;
generate a second wafer vector of the third process variable and the fourth process variable;
generate a third wafer vector of the fifth process variable and the sixth process variable;
calculate a first Euclidean distance between the first wafer vector and the second wafer vector;
calculate a first Cosine distance between the first wafer vector and the second wafer vector;
calculate a second Euclidean distance between the first wafer vector and the third wafer vector;
calculate a second Cosine distance between the first wafer vector and the third wafer vector;
calculate a third Euclidean distance between the second wafer vector and the third wafer vector;
calculate a third Cosine distance between the second wafer vector and the third wafer vector;
generate a first abnormal wafer index of the first wafer based on a product of the first Euclidean distance and the first Cosine distance and a product of the second Euclidean distance and the second Cosine distance;
generate a second abnormal wafer index of the second wafer based on the product of the first Euclidean distance and the first Cosine distance and a product of the third Euclidean distance and the third Cosine distance;
generate a third abnormal wafer index of the third wafer based on a product of the second Euclidean distance and the second Cosine distance and the product of the third Euclidean distance and the third Cosine distance;
predict defective wafers among the first wafer, the second wafer, and the third wafer using the first abnormal wafer index, the second abnormal wafer index, and the third abnormal wafer index; and
test whether one or more of the first wafer, the second wafer, and the third wafer is defective based upon one or more of the first abnormal wafer index, the second abnormal wafer index, and the third abnormal wafer index.

10. The wafer defect test system of claim 9,
wherein the first abnormal wafer index, the second abnormal wafer index, and the third abnormal wafer index have different values, and
wherein a value of the first abnormal wafer index is larger than a value of the second abnormal wafer index and a value of the third abnormal wafer index.

11. The wafer defect test system of claim 10, wherein the computing apparatus is configured to predict the first wafer as being defective, using the first abnormal wafer index.

12. The wafer defect test system of claim 9, wherein the computing apparatus is configured to:

generate a wafer defect prediction model based on the first process variable, the second process variable, the third process variable, the fourth process variable, the fifth process variable, and the sixth process variable and the first abnormal wafer index, the second abnormal wafer index, and the third abnormal wafer index; and predict at least one defective wafer among the first wafer, the second wafer, and the third wafer using the wafer defect prediction model.

13. The wafer defect test system of claim 9,
wherein the first abnormal wafer index is proportional to a sum of the product of the first Euclidean distance and the first Cosine distance and the product of the second Euclidean distance and the second Cosine distance,
wherein the second abnormal wafer index is proportional to the sum of the product of the first Euclidean distance and the first Cosine distance and the product of the third Euclidean distance and the third Cosine distance, and
wherein the third abnormal wafer index is proportional to the sum of the product of the second Euclidean distance and the second Cosine distance and the product of the third Euclidean distance and the third Cosine distance.

14. The wafer defect test system of claim 9, further comprising:
a test apparatus configured to test the first wafer, the second wafer, and the third wafer,
wherein the test apparatus is configured to:
test the first wafer to generate a first characteristic variable;
test the second wafer to generate a second characteristic variable; and
test the third wafer to generate a third characteristic variable.

15. The wafer defect test system of claim 14, wherein the computing apparatus is configured to:
generate a wafer defect prediction model based on the first characteristic variable, the second characteristic variable, and the third characteristic variable, the first process variable, the second process variable, the third process variable, the fourth process variable, the fifth process variable, and the sixth process variable, and the first abnormal wafer index, the second abnormal wafer index, and the third abnormal wafer index; and
predict at least one defective wafer among the first wafer, the second wafer, and the third wafer using the wafer defect prediction model.

16. A method for fabricating a wafer, the method comprising:
fabricating a first wafer, a second wafer, and a third wafer, which are different from each other;
generating a wafer defect prediction model using the first wafer and the second wafer; and
testing for a defect of the third wafer using the wafer defect prediction model,
wherein generating the wafer defect prediction model includes:
monitoring the first wafer to generate a first wafer vector of a first process variable and a second process variable;
monitoring the second wafer to generate a second wafer vector of a third process variable and a fourth process variable;
calculating a first Euclidean distance between the first wafer vector and the second wafer vector;
calculating a first Cosine distance between the first wafer vector and the second wafer vector;
generating a first abnormal wafer index of the first wafer based on a product of the first Euclidean distance and the first Cosine distance;
generating a first characteristic variable by testing the first wafer; and
generating a wafer defect prediction model through regression based on the first process variable, the second process variable, the first characteristic variable, and the first abnormal wafer index.

17. The method for fabricating the wafer of claim 16, wherein testing for the defect of the third wafer using the wafer defect prediction model includes:
monitoring the third wafer to generate a third wafer vector of a fifth process variable and a sixth process variable;
generating a second abnormal wafer index that is a sum of a product of a second Euclidean distance and a second Cosine distance between the third wafer vector and the first wafer vector, and a product of a third Euclidean distance and a third Cosine distance between the third wafer vector and the second wafer vector; and
detecting whether the third wafer is defective based on the fifth process variable, the sixth process variable, the second abnormal wafer index, and the wafer defect prediction model.

18. The method for fabricating the wafer of claim 17, wherein the third wafer is fabricated based on whether the third wafer is defective.

19. The method for fabricating the wafer of claim 17, further comprising:
performing feedback on the fabrication of a fourth wafer different from the first wafer, the second wafer, and the third wafer based on whether the third wafer is defective.

* * * * *